US012131182B2

(12) United States Patent
Wang et al.

(10) Patent No.: US 12,131,182 B2
(45) Date of Patent: Oct. 29, 2024

(54) CONVOLUTIONAL NEURAL NETWORK OPERATION GROUPING BASED ON MEMORY UNIT CAPACITY

(71) Applicant: Nanjing Horizon Robotics Technology Co., Ltd., Nanjing (CN)

(72) Inventors: Zhenjiang Wang, Beijing (CN); Jianjun Li, Beijing (CN); Liang Chen, Beijing (CN); Kun Ling, Beijing (CN); Delin Li, Beijing (CN); Chen Sun, Beijing (CN)

(73) Assignee: Nanjing Horizon Robotics Technology Co., Ltd., Nanjing (CN)

( * ) Notice: Subject to any disclaimer, the term of this patent is extended or adjusted under 35 U.S.C. 154(b) by 728 days.

(21) Appl. No.: 16/362,281

(22) Filed: Mar. 22, 2019

(65) Prior Publication Data

US 2019/0294438 A1 Sep. 26, 2019

(30) Foreign Application Priority Data

Mar. 22, 2018 (WO) ................ PCT/CN2018/080010

(51) Int. Cl.
*G06F 9/48* (2006.01)
*G06F 9/30* (2018.01)
*G06F 9/345* (2018.01)
*G06F 9/50* (2006.01)
*G06N 3/063* (2023.01)

(52) U.S. Cl.
CPC ........ *G06F 9/4881* (2013.01); *G06F 9/30007* (2013.01); *G06F 9/3004* (2013.01); *G06F 9/30076* (2013.01); *G06F 9/345* (2013.01); *G06F 9/5016* (2013.01); *G06N 3/063* (2013.01)

(58) Field of Classification Search
CPC .. G06N 3/063; G06N 3/10; G06F 9/00; G06F 9/4881; G06F 9/30007; G06F 9/3004; G06F 9/30076; G06F 9/345
See application file for complete search history.

(56) References Cited

U.S. PATENT DOCUMENTS 10,019,668 B1 * 7/2018 Woo ................. G06F 9/5016
10,664,310 B2 * 5/2020 Bokhari ................ G06F 8/443
2017/0323196 A1 11/2017 Gibson
(Continued)

OTHER PUBLICATIONS

Han et al., "CNN-MERP: An FPGA-Based Memory-Efficient Reconfigurable Processor for Forward and Backward Propagation of Convolutional Neural Networks", 2016, 8 pages.*
(Continued)

*Primary Examiner* — David J. Huisman
(74) *Attorney, Agent, or Firm* — K&L Gates LLP

(57) ABSTRACT

Systems and methods of data processing are provided. The method comprises receiving an input data to be processed by a series of operations, identifying a first operation from the series of operations, selecting at least one second operation from the series of operations to be grouped with the first operation based at least in part on an amount of an input data and an output data of the grouped operations and the capacity of the memory unit, and processing a portion of the input data of the grouped operations. An efficiency of the series of data operations can be improved by ensuring the input data and output data of any data operations are both stored in the memory unit.

6 Claims, 7 Drawing Sheets

(56) References Cited

U.S. PATENT DOCUMENTS

| | | | |
|---|---|---|---|
| 2018/0032859 A1* | 2/2018 | Park | G06N 3/063 |
| 2019/0147337 A1* | 5/2019 | Yang | G06N 3/063 |
| | | | 706/25 |
| 2019/0220734 A1* | 7/2019 | Ferdman | G06N 3/063 |
| 2019/0243755 A1* | 8/2019 | Luo | G06N 3/04 |
| 2019/0303762 A1* | 10/2019 | Sui | G06N 3/063 |
| 2020/0192631 A1* | 6/2020 | Nemlekar | G06F 17/16 |

OTHER PUBLICATIONS

Extended European Search Report for Application No. EP19164382.4, dated Aug. 16, 2019, 12 pages.

Manoj Alwani et al: "Fused-layer CNN accelerators", 2016 49th Annual IEEE/ACM International Symposium on Microarchitecture (MICRO), Oct. 1, 2016 (Oct. 1, 2016), pp. 1-12, XP055573938, DOI: 10.1109/MICR0.2016.7783725 ISBN: 978-1-5090-3508-3.

Krizhevsky et al., "ImageNet Classification with Deep Convolutional Neural Networks," Advances in neural information processing systems, [http://code.google.com/p/cuda-convnet/], 2012, pp. 1097-1105.

* cited by examiner

CONVOLUTIONAL NEURAL NETWORK OPERATION GROUPING BASED ON MEMORY UNIT CAPACITY

BACKGROUND OF THE INVENTION

Deep computing frameworks, such as Convolutional Neural Networks (CNNs), have been used in many application areas, including pattern recognition, signal processing, time series analysis, and the like. With the development of convolutional neural network algorithms, CNNs can be used in an increasing number of application scenarios. Some application scenarios of CNNs can be sensitive to the power consumption and the cost. For example, the capacity of Static Random-Access Memory (SRAM) of an embedded device can be limited to reduce a cost of the embedded device.

However, in order to ensure the output accuracy of the embedded device, the input data (e.g., an image with a high resolution) having a data amount larger than the capacity of the SRAM can be provided. It would be helpful to have a method and system that implement the operation by splitting the operation into a plurality of split operations, such that the data for each split operation is smaller than the capacity of the SRAM.

SUMMARY OF THE INVENTION

Systems and methods of data processing are provided to split a data operation such that the data amount of each split operation is smaller than the capacity of a memory unit (e.g., an on-chip memory of an embedded device). In some instances, the amount of input data and output data of a data operation can be larger than the capacity of the memory unit in order to ensure the output accuracy of the data processing. The input data and/or the output data have to be provided in an external memory storage which can reduce a computing efficiency of the data processing. The systems and methods of the disclosure provide a solution to split the data operation of which an amount of the input data and output data exceeds the size of the memory unit. Each split operation has an amount of input data and output data which does not exceed the memory unit, such that the input data and output data of each split operation are both stored and processed within the memory unit.

The systems and methods of the disclosure can be used to improve the efficiency of data processing where a series of operations are sequentially performed and an amount of input data and output data of one or more operations exceeds the capacity of the memory unit. The operation having an amount of input data and output data exceeding the capacity of the memory unit can be grouped with one or more other operations, such that an amount of input data and output data of the grouped operation does not exceed the size of the memory unit. The grouped operation can be split, each split operation having a data amount smaller than the capacity of the memory unit. Each split operation can generate a part of the processing result of the grouped operations, and the processing result of the grouped operations can be obtained once all split operations are performed.

An aspect of the disclosure provides a method of data processing. The method can comprise (a) receiving an input data to be processed by a series of operations; (b) identifying a first operation from the series of operations, wherein the first operation has an amount of an input data and an output data exceeding a capacity of a memory unit; (c) selecting at least one second operation from the series of operations to be grouped with the first operation based at least in part on an amount of an input data and an output data of the grouped operations and the capacity of the memory unit; and (d) processing a portion of the input data of the grouped operations, wherein the portion of the input data is determined based at least in part on an amount of an intermediate data result of the grouped operations.

In some embodiments, the series of operations can comprise a series of convolution operations. Alternatively, the series of operations can comprise a series of tensor operations. For instance, the series of operations can comprise a series of pooling, a series of upscaling or a series of Rectified Linear Units (ReLUs). In some embodiments, the memory unit can comprises a static random access memory (SRAM).

In some embodiments, an amount of the output data of the first operation can be determined based on an amount of the input data of the first operation and one or more parameters of the first operation. In some embodiments, an amount of the output data of the grouped operations can be determined based on an amount of the input data of the grouped operations and one or more parameters of the grouped operations. In some embodiments, the at least one second operation can comprise an operation from the series of operations which is immediately adjacent to the first operation. In some instances, the at least one second operation can comprise an operation from the series of operations which is immediately preceding the first operation. The at least one second operation can comprise an operation from the series of operations which is immediately subsequent to the first operation. The at least one second operation can comprise an operation from the series of operations which is immediately preceding the first operation and an operation from the series of operations which is immediately subsequent to the first operation.

In some embodiments, the processing (c) can comprise determining whether the amount of the input data and the output data of the grouped operations exceeds the capacity of the memory unit. In some instances, the processing (c) can comprise incrementally increasing a number of operations in the at least one second operation until the amount of the input data and the output data of the grouped operations does not exceed the capacity of the memory unit. For instance, the processing (c) can further comprise storing the output data of the grouped operations in an external memory when (1) a number of operations in the grouped operations is equal to a number of operations in the series of operations, and (2) the amount of the input data and the output data of the grouped operations exceeds the capacity of the memory unit. For instance, the processing (c) can further comprise storing the input data of the grouped operations in an external memory when (1) a number of operations in the grouped operations is equal to a number of operations in the series of operations, and (2) the amount of the input data and the output data of the grouped operations exceeds the capacity of the memory unit. For instance, the processing (c) can further comprise storing the input data and the output data of the grouped operations in an external memory when (1) a number of operations in the grouped operations is equal to a number of operations in the series of operations, and (2) the amount of the input data and the output data of the grouped operations exceeds the capacity of the memory unit.

In some embodiments, the portion of the input data of the grouped operations can comprise one of N equal parts of the input data and a marginal data, N being an integer of 2 or larger. In some instances, the processing (c) can comprise determining the at least one second operation such that the value of N is minimal. The processing (d) can be performed at least N times. The portion of the input data of the grouped operations can comprise at least a part of another portion of the input data of the grouped operations. In some instances, N can be determined based at least in part on (1) the amount of the input data and the output data of the grouped operations, (2) the capacity of the memory unit, and (3) the amount of an intermediate data result of the grouped operations.

In some embodiments, the input data, the intermediate data result and the output data of the grouped operations can be stored in different slices of the memory unit.

In some embodiments, the processing (c) can further comprise storing the output data of the grouped operations in an external memory when (1) a number of operations in the grouped operations is equal to a number of operations in the series of operations, and (2) the amount of the input data and the output data of the grouped operations exceeds the capacity of the memory unit. The processing (d) can comprise storing the input data and the intermediate data result of the grouped operations in the memory unit.

In some embodiments, the processing (c) can further comprise storing the input data of the grouped operations in an external memory when (1) a number of operations in the grouped operations is equal to a number of operations in the series of operations, and (2) the amount of the input data and the output data of the grouped operations exceeds the capacity of the memory unit. The processing (d) can comprise receiving the portion of the input data of the grouped operations from the external memory. The processing (d) can comprise storing the intermediate data result and the output data of the grouped operations in the memory unit.

In some embodiments, the processing (d) can comprise storing the input data, the intermediate data result and the output data of the grouped operations in the memory unit. In some embodiments, the method can further comprise (e) obtaining a portion of the output data of the grouped operation, and assembling each portion of the output data of the grouped operation to obtain the output data of the grouped operation.

Another aspect of the disclosure provides a system of data processing. The system can comprise one or more processors; at least one memory unit; and one or more memories having instructions stored thereon which when executed by the one or more processors cause the one or more processors to: (a) receive an input data to be processed by a series of operations; (b) identify a first operation from the series of operations, wherein the first operation has an amount of an input data and an output data exceeding a capacity of the memory unit; (c) select at least one second operation from the series of operations to be grouped with the first operation based at least in part on an amount of an input data and an output data of the grouped operations and the capacity of the memory unit; and (d) process a portion of the input data of the grouped operations, wherein the portion of the input data is determined based at least in part on an amount of an intermediate data result of the grouped operations.

In some embodiments, the series of operations can comprise a series of convolution operations. Alternatively, the series of operations can comprise a series of tensor operations. For instance, the series of operations can comprise a series of pooling, a series of upscaling or a series of Rectified Linear Units (ReLUs). In some embodiments, the memory unit can comprises a static random access memory (SRAM).

In some embodiments, an amount of the output data of the first operation can be determined based on an amount of the input data of the first operation and one or more parameters of the first operation. In some embodiments, an amount of the output data of the grouped operations can be determined based on an amount of the input data of the grouped operations and one or more parameters of the grouped operations. In some embodiments, the at least one second operation can comprise an operation from the series of operations which is immediately adjacent to the first operation. In some instances, the at least one second operation can comprise an operation from the series of operations which is immediately preceding the first operation. The at least one second operation can comprise an operation from the series of operations which is immediately subsequent to the first operation. The at least one second operation can comprise an operation from the series of operations which is immediately preceding the first operation and an operation from the series of operations which is immediately subsequent to the first operation.

In some embodiments, the processing (c) can comprise determining whether the amount of the input data and the output data of the grouped operations exceeds the capacity of the memory unit. In some instances, the processing (c) can comprise incrementally increasing a number of operations in the at least one second operation until the amount of the input data and the output data of the grouped operations does not exceed the capacity of the memory unit. For instance, the processing (c) can further comprise storing the output data of the grouped operations in an external memory when (1) a number of operations in the grouped operations is equal to a number of operations in the series of operations, and (2) the amount of the input data and the output data of the grouped operations exceeds the capacity of the memory unit. For instance, the processing (c) can further comprise storing the input data of the grouped operations in an external memory when (1) a number of operations in the grouped operations is equal to a number of operations in the series of operations, and (2) the amount of the input data and the output data of the grouped operations exceeds the capacity of the memory unit. For instance, the processing (c) can further comprise storing the input data and the output data of the grouped operations in an external memory when (1) a number of operations in the grouped operations is equal to a number of operations in the series of operations, and (2) the amount of the input data and the output data of the grouped operations exceeds the capacity of the memory unit.

In some embodiments, the portion of the input data of the grouped operations can comprise one of N equal parts of the input data and a marginal data, N being an integer of 2 or larger. In some instances, the processing (c) can comprise determining the at least one second operation such that the value of N is minimal. The processing (d) can be performed at least N times. The portion of the input data of the grouped operations can comprise at least a part of another portion of the input data of the grouped operations. In some instances, N can be determined based at least in part on (1) the amount of the input data and the output data of the grouped operations, (2) the capacity of the memory unit, and (3) the amount of an intermediate data result of the grouped operations.

In some embodiments, the input data, the intermediate data result and the output data of the grouped operations can be stored in different slices of the memory unit.

In some embodiments, the processing (c) can further comprise storing the output data of the grouped operations in an external memory when (1) a number of operations in the grouped operations is equal to a number of operations in the series of operations, and (2) the amount of the input data and the output data of the grouped operations exceeds the capacity of the memory unit. The processing (d) can comprise storing the input data and the intermediate data result of the grouped operations in the memory unit.

In some embodiments, the processing (c) can further comprise storing the input data of the grouped operations in an external memory when (1) a number of operations in the grouped operations is equal to a number of operations in the series of operations, and (2) the amount of the input data and the output data of the grouped operations exceeds the capacity of the memory unit. The processing (d) can comprise receiving the portion of the input data of the grouped operations from the external memory. The processing (d) can comprise storing the intermediate data result and the output data of the grouped operations in the memory unit.

In some embodiments, the processing (d) can comprise storing the input data, the intermediate data result and the output data of the grouped operations in the memory unit. In some embodiments, the one or more memories having instructions stored thereon which when executed by the one or more processors further cause the one or more processors to (e) obtain a portion of the output data of the grouped operation, and assemble each portion of the output data of the grouped operation to obtain the output data of the grouped operation.

A further aspect of the disclosure provides a non-transitory computer readable medium comprising machine executable code that, upon execution by one or more computer processors, implements a method of data processing. The non-transitory computer readable medium can comprise program instructions for (a) receiving an input data to be processed by a series of operations; program instructions for (b) identifying a first operation from the series of operations, wherein the first operation has an amount of an input data and an output data exceeding a capacity of a memory unit; program instructions for (c) selecting at least one second operation from the series of operations to be grouped with the first operation based at least in part on an amount of an input data and an output data of the grouped operations and the capacity of the memory unit; and program instructions for (d) processing a portion of the input data of the grouped operations, wherein the portion of the input data is determined based at least in part on an amount of an intermediate data result of the grouped operations.

In some embodiments, the series of operations can comprise a series of convolution operations. Alternatively, the series of operations can comprise a series of tensor operations. For instance, the series of operations can comprise a series of pooling, a series of upscaling or a series of Rectified Linear Units (ReLUs). In some embodiments, the memory unit can comprises a static random access memory (SRAM).

In some embodiments, an amount of the output data of the first operation can be determined based on an amount of the input data of the first operation and one or more parameters of the first operation. In some embodiments, an amount of the output data of the grouped operations can be determined based on an amount of the input data of the grouped operations and one or more parameters of the grouped operations. In some embodiments, the at least one second operation can comprise an operation from the series of operations which is immediately adjacent to the first operation. In some instances, the at least one second operation can comprise an operation from the series of operations which is immediately preceding the first operation. The at least one second operation can comprise an operation from the series of operations which is immediately subsequent to the first operation. The at least one second operation can comprise an operation from the series of operations which is immediately preceding the first operation and an operation from the series of operations which is immediately subsequent to the first operation.

In some embodiments, the program instructions for (c) can comprise program instructions for determining whether the amount of the input data and the output data of the grouped operations exceeds the capacity of the memory unit. In some instances, the program instructions for (c) can comprise program instructions for incrementally increasing a number of operations in the at least one second operation until the amount of the input data and the output data of the grouped operations does not exceed the capacity of the memory unit. For instance, the program instructions for (c) can further comprise program instructions for storing the output data of the grouped operations in an external memory when (1) a number of operations in the grouped operations is equal to a number of operations in the series of operations, and (2) the amount of the input data and the output data of the grouped operations exceeds the capacity of the memory unit. For instance, the program instructions for (c) can further comprise program instructions for storing the input data of the grouped operations in an external memory when (1) a number of operations in the grouped operations is equal to a number of operations in the series of operations, and (2) the amount of the input data and the output data of the grouped operations exceeds the capacity of the memory unit. For instance, the program instructions for (c) can further comprise program instructions for storing the input data and the output data of the grouped operations in an external memory when (1) a number of operations in the grouped operations is equal to a number of operations in the series of operations, and (2) the amount of the input data and the output data of the grouped operations exceeds the capacity of the memory unit.

In some embodiments, the portion of the input data of the grouped operations can comprise one of N equal parts of the input data and a marginal data, N being an integer of 2 or larger. In some instances, the program instructions for (c) can comprise program instructions for determining the at least one second operation such that the value of N is minimal. The program instructions for (d) can be executed at least N times. The portion of the input data of the grouped operations can comprise at least a part of another portion of the input data of the grouped operations. In some instances, N can be determined based at least in part on (1) the amount of the input data and the output data of the grouped operations, (2) the capacity of the memory unit, and (3) the amount of an intermediate data result of the grouped operations.

In some embodiments, the input data, the intermediate data result and the output data of the grouped operations can be stored in different slices of the memory unit.

In some embodiments, the program instructions for (c) can further comprise program instructions for storing the output data of the grouped operations in an external memory when (1) a number of operations in the grouped operations is equal to a number of operations in the series of operations, and (2) the amount of the input data and the output data of the grouped operations exceeds the capacity of the memory unit. The program instructions for (d) can comprise program instructions for storing the input data and the intermediate data result of the grouped operations in the memory unit.

In some embodiments, the program instructions for (c) can further comprise program instructions for storing the input data of the grouped operations in an external memory when (1) a number of operations in the grouped operations is equal to a number of operations in the series of operations, and (2) the amount of the input data and the output data of the grouped operations exceeds the capacity of the memory unit. The program instructions for (d) can comprise program instructions for receiving the portion of the input data of the grouped operations from the external memory. The program instructions for (d) can comprise program instructions for storing the intermediate data result and the output data of the grouped operations in the memory unit.

In some embodiments, the program instructions for (d) can comprise program instructions for storing the input data, the intermediate data result and the output data of the grouped operations in the memory unit. In some embodiments, the non-transitory computer readable medium can further comprise program instructions for (e) obtaining a portion of the output data of the grouped operation, and assembling each portion of the output data of the grouped operation to obtain the output data of the grouped operation.

In another aspect, the application relates to the following:

1. A method of data processing, said method comprising:
   (a) receiving an input data to be processed by a series of operations;
   (b) identifying a first operation from the series of operations, wherein the first operation has an amount of an input data and an output data exceeding a capacity of a memory unit;
   (c) selecting at least one second operation from the series of operations to be grouped with the first operation based at least in part on an amount of an input data and an output data of the grouped operations and the capacity of the memory unit; and
   (d) processing a portion of the input data of the grouped operations, wherein the portion of the input data is determined based at least in part on an amount of an intermediate data result of the grouped operations.

2. The method of item 1, wherein the series of operations comprise a series of convolution operations.

3. The method of item 1, wherein the series of operations comprise a series of tensor operations.

4. The method of item 3, wherein the series of operations comprise a series of pooling.

5. The method of item 3, wherein the series of operations comprise a series of upscaling.

6. The method of item 3, wherein the series of operations comprise a series of Rectified Linear Units (ReLUs).

7. The method of item 1, wherein the memory unit comprises a static random access memory (SRAM).

8. The method of item 1, wherein an amount of the output data of the first operation is determined based on an amount of the input data of the first operation and one or more parameters of the first operation.

9. The method of item 1, wherein an amount of the output data of the grouped operations is determined based on an amount of the input data of the grouped operations and one or more parameters of the grouped operations.

10. The method of item 1, wherein the at least one second operation comprises an operation from the series of operations which is immediately adjacent to the first operation.

11. The method of item 10, wherein the at least one second operation comprises an operation from the series of operations which is immediately preceding the first operation.

12. The method of item 10, wherein the at least one second operation comprises an operation from the series of operations which is immediately subsequent to the first operation.

13. The method of item 10, wherein the at least one second operation comprises an operation from the series of operations which is immediately preceding the first operation and an operation from the series of operations which is immediately subsequent to the first operation.

14. The method of item 1, wherein (c) comprises determining whether the amount of the input data and the output data of the grouped operations exceeds the capacity of the memory unit.

15. The method of item 14, wherein (c) comprises incrementally increasing a number of operations in the at least one second operation until the amount of the input data and the output data of the grouped operations does not exceed the capacity of the memory unit.

16. The method of item 15, wherein (c) further comprises storing the output data of the grouped operations in an external memory when (1) a number of operations in the grouped operations is equal to a number of operations in the series of operations, and (2) the amount of the input data and the output data of the grouped operations exceeds the capacity of the memory unit.

17. The method of item 15, wherein (c) further comprises storing the input data of the grouped operations in an external memory when (1) a number of operations in the grouped operations is equal to a number of operations in the series of operations, and (2) the amount of the input data and the output data of the grouped operations exceeds the capacity of the memory unit.

18. The method of item 15, wherein (c) further comprises storing the input data and the output data of the grouped operations in an external memory when (1) a number of operations in the grouped operations is equal to a number of operations in the series of operations, and (2) the amount of the input data and the output data of the grouped operations exceeds the capacity of the memory unit.

19. The method of item 1, wherein the portion of the input data of the grouped operations comprises one of N equal parts of the input data and a marginal data, N being an integer of 2 or larger.

20. The method of item 19, wherein (c) comprises determining the at least one second operation such that the value of N is minimal.

21. The method of item 19, wherein (d) is performed at least N times.

22. The method of item 19, wherein the portion of the input data of the grouped operations comprises at least a part of another portion of the input data of the grouped operations.

23. The method of item 19, wherein N is determined based at least in part on (1) the amount of the input data and the output data of the grouped operations, (2) the capacity of the memory unit, and (3) the amount of an intermediate data result of the grouped operations.

24. The method of item 1, wherein the input data, the intermediate data result and the output data of the grouped operations are stored in different slices of the memory unit.

25. The method of item 1, wherein (c) further comprises storing the output data of the grouped operations in an external memory when (1) a number of operations in the grouped operations is equal to a number of operations in the series of operations, and (2) the amount of the input data and the output data of the grouped operations exceeds the capacity of the memory unit.

26. The method of item 25, wherein (d) comprises storing the input data and the intermediate data result of the grouped operations in the memory unit.

27. The method of item 1, wherein (c) further comprises storing the input data of the grouped operations in an external memory when (1) a number of operations in the grouped operations is equal to a number of operations in the series of operations, and (2) the amount of the input data and the output data of the grouped operations exceeds the capacity of the memory unit.

28. The method of item 27, wherein (d) comprises receiving the portion of the input data of the grouped operations from the external memory.

29. The method of item 27, wherein (d) comprises storing the intermediate data result and the output data of the grouped operations in the memory unit.

30. The method of item 1, wherein (d) comprises storing the input data, the intermediate data result and the output data of the grouped operations in the memory unit.

31. The method of item 1, further comprising (e) obtaining a portion the output data of the grouped operation, and assembling each portion the output data of the grouped operation to obtain the output data of the grouped operation.

32. A system of data processing, said system comprising:
one or more processors;
at least one memory unit; and
one or more memories having instructions stored thereon which when executed by the one or more processors cause the one or more processors to:
(a) receive an input data to be processed by a series of operations;
(b) identify a first operation from the series of operations, wherein the first operation has an amount of an input data and an output data exceeding a capacity of the memory unit;
(c) select at least one second operation from the series of operations to be grouped with the first operation based at least in part on an amount of an input data and an output data of the grouped operations and the capacity of the memory unit; and
(d) process a portion of the input data of the grouped operations, wherein the portion of the input data is determined based at least in part on an amount of an intermediate data result of the grouped operations.

33. The system of item 32, wherein the series of operations comprise a series of convolution operations.

34. The system of item 32, wherein the series of operations comprise a series of tensor operations.

35. The system of item 34, wherein the series of operations comprise a series of pooling.

36. The system of item 34, wherein the series of operations comprise a series of upscaling.

37. The system of item 34, wherein the series of operations comprise a series of Rectified Linear Units (ReLUs).

38. The system of item 32, wherein the memory unit comprises a static random access memory (SRAM).

39. The system of item 32, wherein an amount of the output data of the first operation is determined based on an amount of the input data of the first operation and one or more parameters of the first operation.

40. The system of item 32, wherein an amount of the output data of the grouped operations is determined based on an amount of the input data of the grouped operations and one or more parameters of the grouped operations.

41. The system of item 32, wherein the at least one second operation comprises an operation from the series of operations which is immediately adjacent to the first operation.

42. The system of item 41, wherein the at least one second operation comprises an operation from the series of operations which is immediately preceding the first operation.

43. The system of item 41, wherein the at least one second operation comprises an operation from the series of operations which is immediately succeeding the first operation.

44. The system of item 41, wherein the at least one second operation comprises an operation from the series of operations which is immediately preceding the first operation and an operation from the series of operations which is immediately succeeding the first operation.

45. The system of item 32, wherein (c) comprises determining whether the amount of the input data and the output data of the grouped operations exceeds the capacity of the memory unit.

46. The system of item 45, wherein (c) comprises incrementally increasing a number of operations in the at least one second operation until the amount of the input data and the output data of the grouped operations does not exceed the capacity of the memory unit.

47. The system of item 46, wherein (c) further comprises storing the output data of the grouped operations in an external memory when (1) a number of operations in the grouped operations is equal to a number of operations in the series of operations, and (2) the amount of the input data and the output data of the grouped operations exceeds the capacity of the memory unit.

48. The system of item 46, wherein (c) further comprises storing the input data of the grouped operations in an external memory when (1) a number of operations in the grouped operations is equal to a number of operations in the series of operations, and (2) the amount of the input data and the output data of the grouped operations exceeds the capacity of the memory unit.

49. The system of item 46, wherein (c) further comprises storing the input data and the output data of the grouped operations in an external memory when (1) a number of operations in the grouped operations is equal to a number of operations in the series of operations, and (2) the amount of the input data and the output data of the grouped operations exceeds the capacity of the memory unit.

50. The system of item 32, wherein the portion of the input data of the grouped operations comprises one of N equal parts of the input data and a marginal data, N being an integer of 2 or larger.

51. The system of item 50, wherein (c) comprises determining the at least one second operation such that the value of N is minimal.

52. The system of item 50, wherein (d) is performed at least N times.

53. The system of item 50, wherein the portion of the input data of the grouped operations comprises at least a part of another portion of the input data of the grouped operations.

54. The system of item 50, wherein N is determined based at least in part on (1) the amount of the input data and the output data of the grouped operations, (2) the capacity of the memory unit, and (3) the amount of an intermediate data result of the grouped operations.

55. The system of item 32, wherein the input data, the intermediate data result and the output data of the grouped operations are stored in different slices of the memory unit.

56. The system of item 32, wherein (c) further comprises storing the output data of the grouped operations in an external memory when (1) a number of operations in the grouped operations is equal to a number of operations in the series of operations, and (2) the amount of the input data and the output data of the grouped operations exceeds the capacity of the memory unit.

57. The system of item 56, wherein (d) comprises storing the input data and the intermediate data result of the grouped operations in the memory unit.

58. The system of item 32, wherein (c) further comprises storing the input data of the grouped operations in an external memory when (1) a number of operations in the grouped operations is equal to a number of operations in the series of operations, and (2) the amount of the input data and the output data of the grouped operations exceeds the capacity of the memory unit.

59. The system of item 58, wherein (d) comprises receiving the portion of the input data of the grouped operations from the external memory.

60. The system of item 58, wherein (d) comprises storing the intermediate data result and the output data of the grouped operations in the memory unit.

61. The system of item 32, wherein (d) comprises storing the input data, the intermediate data result and the output data of the grouped operations in the memory unit.

62. The system of item 32, wherein the one or more memories having instructions stored thereon which when executed by the one or more processors further cause the one or more processors to (e) obtain a portion the output data of the grouped operation, and assemble each portion the output data of the grouped operation to obtain the output data of the grouped operation.

63. A non-transitory computer readable medium comprising machine executable code that, upon execution by one or more computer processors, implements a method of data processing, said non-transitory computer readable medium comprising:
program instructions for (a) receiving an input data to be processed by a series of operations;
program instructions for (b) identifying a first operation from the series of operations, wherein the first operation has an amount of an input data and an output data exceeding a capacity of a memory unit;
program instructions for (c) selecting at least one second operation from the series of operations to be grouped with the first operation based at least in part on an amount of an input data and an output data of the grouped operations and the capacity of the memory unit; and
program instructions for (d) processing a portion of the input data of the grouped operations, wherein the portion of the input data is determined based at least in part on an amount of an intermediate data result of the grouped operations.

64. The non-transitory computer readable medium of item 63, wherein the series of operations comprise a series of convolution operations.

65. The non-transitory computer readable medium of item 63, wherein the series of operations comprise a series of tensor operations.

66. The non-transitory computer readable medium of item 66, wherein the series of operations comprise a series of pooling.

67. The non-transitory computer readable medium of item 66, wherein the series of operations comprise a series of upscaling.

68. The non-transitory computer readable medium of item 66, wherein the series of operations comprise a series of Rectified Linear Units (ReLUs).

69. The non-transitory computer readable medium of item 63, wherein the memory unit comprises a static random access memory (SRAM).

70. The non-transitory computer readable medium of item 63, wherein an amount of the output data of the first operation is determined based on an amount of the input data of the first operation and one or more parameters of the first operation.

71. The non-transitory computer readable medium of item 63, wherein an amount of the output data of the grouped operations is determined based on an amount of the input data of the grouped operations and one or more parameters of the grouped operations.

72. The non-transitory computer readable medium of item 63, wherein the at least one second operation comprises an operation from the series of operations which is immediately adjacent to the first operation.

73. The non-transitory computer readable medium of item 72, wherein the at least one second operation comprises an operation from the series of operations which is immediately preceding the first operation.

74. The non-transitory computer readable medium of item 72, wherein the at least one second operation comprises an operation from the series of operations which is immediately succeeding the first operation.

75. The non-transitory computer readable medium of item 72, wherein the at least one second operation comprises an operation from the series of operations which is immediately preceding the first operation and an operation from the series of operations which is immediately succeeding the first operation.

76. The non-transitory computer readable medium of item 63, wherein the program instructions for (c) comprises program instructions for determining whether the amount of the input data and the output data of the grouped operations exceeds the capacity of the memory unit.

77. The non-transitory computer readable medium of item 76, wherein the program instructions for (c) comprises program instructions for incrementally increasing a number of operations in the at least one second operation until the amount of the input data and the output data of the grouped operations does not exceed the capacity of the memory unit.

78. The non-transitory computer readable medium of item 77, wherein the program instructions for (c) further comprises program instructions for storing the output data of the grouped operations in an external memory when (1) a number of operations in the grouped operations is equal to a number of operations in the series of operations, and (2) the amount of the input data and the output data of the grouped operations exceeds the capacity of the memory unit.

79. The non-transitory computer readable medium of item 77, wherein the program instructions for (c) further comprises program instructions for storing the input data of the grouped operations in an external memory when (1) a number of operations in the grouped operations is equal to a number of operations in the series of operations, and (2) the amount of the input data and the output data of the grouped operations exceeds the capacity of the memory unit.

80. The non-transitory computer readable medium of item 77, wherein the program instructions for (c) further comprises program instructions for storing the input data and the output data of the grouped operations in an external memory when (1) a number of operations in the grouped operations is equal to a number of operations in the series of operations, and (2) the amount of the input data and the output data of the grouped operations exceeds the capacity of the memory unit.

81. The non-transitory computer readable medium of item 63, wherein the portion of the input data of the grouped operations comprises one of N equal parts of the input data and a marginal data, N being an integer of 2 or larger.

82. The non-transitory computer readable medium of item 81, wherein the program instructions for (c) comprises program instructions for determining the at least one second operation such that the value of N is minimal.

83. The non-transitory computer readable medium of item 81, wherein the program instructions for (d) is executed at least N times.

84. The non-transitory computer readable medium of item 81, wherein the portion of the input data of the grouped operations comprises at least a part of another portion of the input data of the grouped operations.

85. The non-transitory computer readable medium of item 81, wherein N is determined based at least in part on (1) the amount of the input data and the output data of the grouped operations, (2) the capacity of the memory unit, and (3) the amount of an intermediate data result of the grouped operations.

86. The non-transitory computer readable medium of item 63, wherein the input data, the intermediate data result and the output data of the grouped operations are stored in different slices of the memory unit.

87. The non-transitory computer readable medium of item 63, wherein the program instructions for (c) further comprises program instructions for storing the output data of the grouped operations in an external memory when (1) a number of operations in the grouped operations is equal to a number of operations in the series of operations, and (2) the amount of the input data and the output data of the grouped operations exceeds the capacity of the memory unit.

88. The non-transitory computer readable medium of item 87, wherein the program instructions for (d) comprises program instructions for storing the input data and the intermediate data result of the grouped operations in the memory unit.

89. The non-transitory computer readable medium of item 63, wherein the program instructions for (c) further comprises program instructions for storing the input data of the grouped operations in an external memory when (1) a number of operations in the grouped operations is equal to a number of operations in the series of operations, and (2) the amount of the input data and the output data of the grouped operations exceeds the capacity of the memory unit.

90. The non-transitory computer readable medium of item 89, wherein the program instructions for (d) comprises program instructions for receiving the portion of the input data of the grouped operations from the external memory.

91. The non-transitory computer readable medium of item 89, wherein the program instructions for (d) comprises program instructions for storing the intermediate data result and the output data of the grouped operations in the memory unit.

92. The non-transitory computer readable medium of item 63, wherein the program instructions for (d) comprises program instructions for storing the input data, the intermediate data result and the output data of the grouped operations in the memory unit.

93. The non-transitory computer readable medium of item 63, further comprising program instructions for (e) obtaining a portion the output data of the grouped operation, and assembling each portion the output data of the grouped operation to obtain the output data of the grouped operation.

It shall be understood that different aspects of the invention can be appreciated individually, collectively, or in combination with each other. Various aspects of the invention described herein can be applied to any of the particular applications set forth below.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
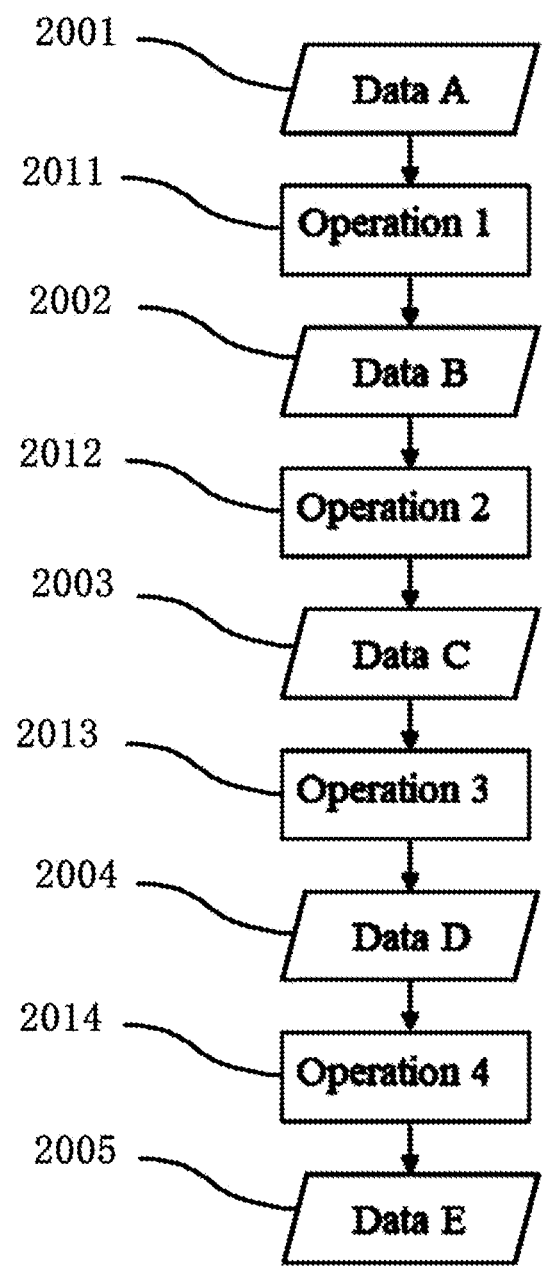
FIG. 1 illustrates a diagram showing a series of data operation.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention.

Systems and methods of data processing are provided to improve efficiency of a series of data operation by ensuring the input data and output data of any data operation are both stored in a memory unit (e.g., on-chip memory of an embedded device). The systems and methods as disclosed here are particularly suitable for data processing in convolutional operations where a portion of input data can be processed to obtain a portion of output data, and the entire output data can be obtained by assembling the respective portions of data. A first operation having an amount of input data and output data exceeding the capacity of the memory unit can be identified from among the series of data operation. The first operation can be grouped with a second operation such that an amount of overall input data and output data of the grouped operation does not exceed the capacity of the memory unit. The grouped operation can be split into a plurality of operations based at least in part on an amount of an intermediate data result. The plurality of operations can be performed sequentially to obtain the output data of the grouped operation. In some embodiments, the series of data operation can comprise a series of convolutional operations. Alternatively, the series of data operation can comprises a series of tensor operations such as pooling, upscaling or ReLU (Rectified Linear Unit).

Systems and method provided herein can have the advantage of lower costs and improved computation efficiency over current technologies. For example, a use of external memory storage can be avoided even if an amount of input data and output data of any data operation exceeds the capacity of the on-chip memory unit of an embedded device. Various aspects of the invention described herein can be applied to any of the particular applications set forth below. The methods and systems can be applied to convolutional neural networks and other deep learning applications. It shall be understood that different aspects of the invention can be appreciated individually, collectively or in combination with each other.

A typical CNN system (Krizhevsky, A., Sutskever, I., & Hinton, G. E. (2012), Imagenet classification with deep convolutional neural networks, Advances in neural information processing systems, pp. 1097-1105) includes one or more convolution layers, one or more pooling layers, and various other operations. A CNN system can comprise any number of layers for different types of operations. The simplest architecture of a convolutional neural networks starts with an input layer (e.g., images) followed by a sequence of convolutional layers and pooling layers, and ends with fully-connected layers. In some cases, the convolutional layers are followed by a layer of ReLU activation function. Other activation functions can also be used, for example the saturating hyperbolic tangent, identity, binary step, logistic, arcTan, softsign, parameteric rectified linear unit, exponential linear unit, softPlus, bent identity, softExponential, Sinusoid, Sinc, Gaussian, the sigmoid function and various others. The convolutional, pooling and ReLU layers can act as learnable features extractors, while the fully connected layers can act as a machine learning classifier.

In some cases, the convolutional layers and fully-connected layers can include parameters or weights. These parameters or weights can be learned in a training phase. The parameters can be trained with gradient descent so that the class scores that the CNN computes are consistent with the labels in the training set for each image. The parameters can be obtained from a back propagation neural network training process that can or cannot be performed using the same hardware as the production or application process.

A convolution layer can comprise one or more filters. These filters can activate when they see same specific structure in the input data. In some cases, the input data can be one or more images, and in the convolution layer one or more filter operations can be applied to the pixels of the image. A convolution layer can comprise a set of learnable filters that slide over the image spatially, computing dot products between the entries of the filter and the input image. The filter operations can be implemented as convolution of a kernel over the entire image. A filter can interchangeably refer to a kernel throughout this disclosure. A kernel can comprise one or more parameters. Results of the filter operations can be summed together across channels to provide an output from the convolution layer to the next pooling layer. A convolution layer can perform high-dimension convolutions. The filters should extend to the full depth of the input image. For example, if we want to apply a filter of size 5×5 to a colored image of size 32×32, then the filter should have depth 3 (5×5×3) to cover all three color channels (Red, Green, Blue) of the image.

In some cases, a convolution layer can be a depthwise separable convolution. In such scenario, a convolution layer can be factorized into a depthwise convolution and a 1×1 pointwise convolution to combine the outputs of the depthwise convolution. The convolution layer can be split into a layer for filtering (i.e., depthwise convolution layer) and a layer for combining (i.e., pointwise convolution layer). In some cases, in a depthwise convolution layer, a single filter can be applied to each input channel, and in a pointwise convolution layer, a 1×1 convolution can be performed to combine the output of the depthwise layer. In some cases, both of the depthwise convolution layer and the pointwise convolution layer are followed by an activation layer. In some cases, when the CNN is built on depthwise separable convolutions, the first layer can still be a full convolution.

The input data supplied to a convolution layer can be one, two, three, four, five, six, seven and more dimensions. In some embodiments, the input data supplied to an input layer such as a convolution layer can be dependent on the data characteristics. For example, if the input data is image data, the input data can be three-dimensional. An input data can be an image with volume size of 224×224×3 representing a 224×224 pixels plane for each of three channels. An output feature map generated by a layer can be used as input feature map for a later layer. A size of input feature map (e.g., input data) for the hidden layers can be determined by a number of factors including the number of filters in the previous layers and one or more hyper-parameters. The convolution layer applies filters on input feature maps to extract embedded visual characteristic and generate the output feature maps. In some embodiments, the dimensions of the parameters can be four-dimensional and the input/output feature maps can be three-dimensional. For example, each feature map can be three-dimensional including with two-dimensional planes across multiple channels, and the three-dimensional feature maps are processed by a group of three-dimensional filters in a convolution layer. In some cases, there can be a one-dimensional bias that is added to the convolution results. For example, given the shape of the input feature map plane with size of W×H (i.e., width and height) across C channels, and N filters each has C channels with filter plane dimension R×R (i.e., width and height), the computation of the convolution layer can be defined as:

$$o[z][u][x][y] =$$

$$B[u] + \sum_{k=0}^{C-1} \sum_{i=0}^{R-1} \sum_{j=0}^{R-1} I[z][k][Ux+i][Uy+j] \times W[u][k][i][j] \quad 0 \le z < N,$$

$$0 \le N, 0 \le u < M, 0 \le x, y < E, E = (H - R + U)/U$$

where O, I, W and B represent the matrices of the output features maps, input features maps, filters and biases, respectively. U represents the stride size.

Each convolution layer can comprise a plurality of parameters for the convolution operations. One or more filters can be comprised in each convolution layer. Each filter can comprise one or more parameters or weights. The size of the filters/kernels and the number of filter/kernels can together determine the parameters required for each convolution layer. For example, a convolution layer can comprise four kernels each is a 2×2 plane for three channels thus the resulting total number of weights for the layer is 4×2×2×3. In some embodiments, parameters can also include biases.

The size of the output volume of the convolution layer can also depend on hyper-parameters. The hyper-parameters can also control the size of the output volume of the convolutional layer. In some cases, the hyper-parameters can include depth, stride and zero-padding.

Depth of the output volume controls the number of neurons in the layer that connect to the same region of the input volume. All of these neurons will learn to activate for different features in the input. For example, if the first convolutional layer takes the raw image as input, then different neurons along the depth dimension can activate in the presence of various oriented edges, or blobs of color.

Stride controls how depth columns around the spatial dimensions (width and height) are allocated. When the stride is 1, a new depth column of neurons is allocated to spatial positions only one spatial unit apart. This leads to heavily overlapping receptive fields between the columns, and also to large output volumes. Conversely, if higher strides are used then the receptive fields will overlap less and the resulting output volume will have smaller dimensions spatially.

Sometimes it is convenient to pad the input with zeros on the border of the input volume. The size of this zero-padding is another hyper-parameter. Zero padding provides control of the output volume spatial size. In particular, sometimes it is desirable to exactly preserve the spatial size of the input volume.

The spatial size of the output volume can be computed as a function of the input volume size W, the kernel field size of the convolution layer neurons K, the stride with which they are applied S and the amount of zero padding P. The formula for calculating how many neurons fit in a given volume is given by (W−K+2 P)/S+1. If this number is not an integer, then the strides are set incorrectly and the neurons cannot be tiled to fit across the input volume in a symmetric way. In general, setting zero padding to be P=(K−1)/2 when the stride is S=1 ensures that the input volume and output volume will have the same size spatially. In some cases, it is not necessary to use up all of the neurons of the previous layer.

For example, a convolutional layer receives N feature maps as input. Each input feature map is convolved by a shifting window with a K×K kernel to generate one pixel in one output feature map. The stride of the shifting window is S, which is normally smaller than K. A total of M output feature maps will form the set of input feature maps for the next convolutional layer.

For example, a CNN is composed of eight layers. The first five layers are convolutional layers and layers 6-8 form a fully connected artificial neural network. The algorithm receives three 224×224 input images that are from an original 256×256 three-channel RGB image. The output vector of 1000 elements represents the likelihoods of 1000 categories. Layer 1 receives three input feature maps in 224×224 resolution and 96 output feature maps in 55×55 resolution. The output of Layer 1 is partitioned into two sets, each sized 48 feature maps. Layer 1's kernel size is 11×11 and the sliding window shifts across feature maps in a stride of four pixels. The following layers also have a similar structure. The sliding strides of other layers' convolution window are one pixel.

The number of feature maps can be controlled by controlling the number of filters used in the previous layer. The number of feature maps in the input layer can correspond to the number of channels (e.g., R, G, B). A filter can comprise one or more parameters or weights. A convolution layer can comprise a number of filters. In some cases, the number of filters and a size of a filter (i.e., number of parameters) can be selected for fully utilizing computing units or selected according to a computing capacity of the hardware. In some cases, the number of filters and size of filters can be selected such that a high-efficiency hardware configuration can be used for variable input data.

In some embodiments, a convolution layer and/or fully-connected layer can be followed by an activation layer, such as a rectified linear unit (ReLU). The ReLU layer can apply an elementwise activation function, such as the max (0,x) thresholding at zero. This can leave the volume of the input data unchanged. Other activation functions can also be used, for example the saturating hyperbolic tangent, identity, binary step, logistic, arcTan, softsign, parameteric rectified linear unit, exponential linear unit. softPlus, bent identity, softExponential, Sinusoid, Sinc, Gaussian, the sigmoid function and the like. In some cases, when the CNN comprises depthwise separable convolutions, each of the depthwise convolution and pointwise convolution layers can be followed by a ReLU layer.

In an example, the CNN system can comprise several convolutional layers and pooling or sub-sampling layers. A pooling layer can be a form of non-linear down-sampling. A pooling layer can perform down-sampling to reduce given feature maps to a stack of reduced feature maps. The pooling layer can progressively reduce the spatial size of the input data to reduce the amount of parameters and computation in the network, and hence to also control overfitting. There are several functions to implement pooling such as max pooling, average pooling, or L2-norm pooling. For example, in max pooling operations, the given feature maps can be partitioned into a set of non-overlapping rectangles and, for each such sub-region, outputs the maximum value. In another example, in an average pooling, an average value of a sub-region can be output. The given feature maps can be partitioned by any size. For example, pooling can be applied with filters of size 2×2 applied with a stride of 2 at every depth slice. A pooling layer of size 2×2 with stride of 2 shrinks the given feature maps to a ¼ of its original size.

The output of the pooling layer can be fed to the fully-connected layer to perform pattern detections. In some cases, the fully-connected layer can be for classification purposes that filters can be applied on the input feature maps. The filters can be of the same size as the input feature maps. The fully-connected layer can apply a set of weights or parameters in its inputs and accumulate a result as the output of the fully-connected layer. In some cases, an activation layer can immediately follow the fully-connected layer and output the result of the CNN system. For example, for classification purposes, the output data can be a vector holding classification scores.

The computing architecture can be a pre-trained convolutional neural network. A CNN model can comprise one or more convolution layers. A CNN model can comprise from one to several hundred convolution layers. A CNN model can comprise one or more pooling layers. In some cases, the pooling layer can immediately follow a convolution layer. In some embodiments, ReLU activation operations are combined with convolution operations such that convolution results are processed by activation functions immediately. In some embodiments, convolution and pooling layers can be applied to input data multiples times prior to the data being transmitted to a fully-connected layer. The fully-connected layer can output the final output value which is tested to determine whether a pattern has been recognized or not.

A system is provided for accelerating implementation of select algorithms by improved processing parallelism and memory access through a specifically designed integrated circuit. The select algorithms, such as application of a CNN, can comprise a large number of matrix-matrix multiplications and/or matrix-vector multiplications. The integrated circuit can contain a memory unit and a computing unit capable of performing multiple iterations of parallel operations based on a reduced number of control signals. In some cases, the data is arranged and/or padded with zeros for such that the arrangement of data is aligned with a pre-determined hardware configuration. The data can be arranged to be in accordance with a pre-determined dataflow or data path based on a configuration of hardware circuitries.

In a CNN system, the data involved include CNN parameters and input/output features. A typical CNN system as described above can include a multi-channel convolution layer, max or average pooling layer, Rectified Linear Unit (ReLU), and fully-connected layer. Both fully-connected and multi-channel convolution layers contain large number of numeric weights or parameters that represent the strength of connections between neurons. The data to be loaded to the integrated circuit on a chip can be prepared by a host processor and stored in a main memory, and the data can be transmitted to the chip in a batch fashion.

The CNN parameters can include a plurality of parameters for a convolution layer including but not limited to weights or parameters, biases, hyper-parameters such as padding, stride and depth as described above. The CNN parameters can also include parameters to be used in other types of layers such as fully-connected layer.

The parameters can be arranged and classified into a plurality of groups. In some embodiments, the parameters can be grouped by layers. For example, different layers of the CNN system can correspond to different groups of parameters. The parameters for each layer can be large dimensional matrices. A group of parameters can be stored in a contiguous space. The parameters contained in a group or corresponding to a layer can be stored consecutively in a contiguous space. The parameters within a group can be arranged to be in accordance with the functions or operations performed in a layer of the CNN.

The input data can include image data or sampled speech signals. For example, the image data can include a plurality of image pixel values. The data can be various data types, such as scalar integer, scalar floating point, packed integer, packed floating point, vector integer, vector floating point, and the like.

FIG. 1 illustrates a diagram showing a series of data operation 2011-2014. In the example shown in FIG. 1, an input data A 2001 can be processed by the series of data operation to obtain an output data E 2005. The series of data operation can be sequentially performed. The output data of a preceding operation can serve as the input data of a subsequent operation. For example, the input data A 2001 is first processed by a first operation 1 2011 to obtain a first intermediate data result B 2002. The first intermediate data result B 2002 can then be fed to and processed by a second operation 2 2012 to obtain a second intermediate data result C 2003. The second intermediate data result C 2003 can then be processed by a third operation 3 2013 to obtain a third intermediate data result D 2004. The third intermediate data result D 2004 can then be processed by a fourth operation 4 2014 to obtain the final output data E 2005.

The series of data operation can comprise a series of convolutional operations or tensor operations. The tensor operation can comprise pooling, upscaling or ReLU. One or more layers for each type of operation can be provided. The input data A can be image data, audio, video data and various others. For instance, a typical CNN system can include one or more convolution layers, one or more pooling layers, and various other operations. A CNN system can comprise any number of layers and any number of layers for different types of operations. The output data of a preceding layer can be the input data of a subsequent layer.

Figure 2:
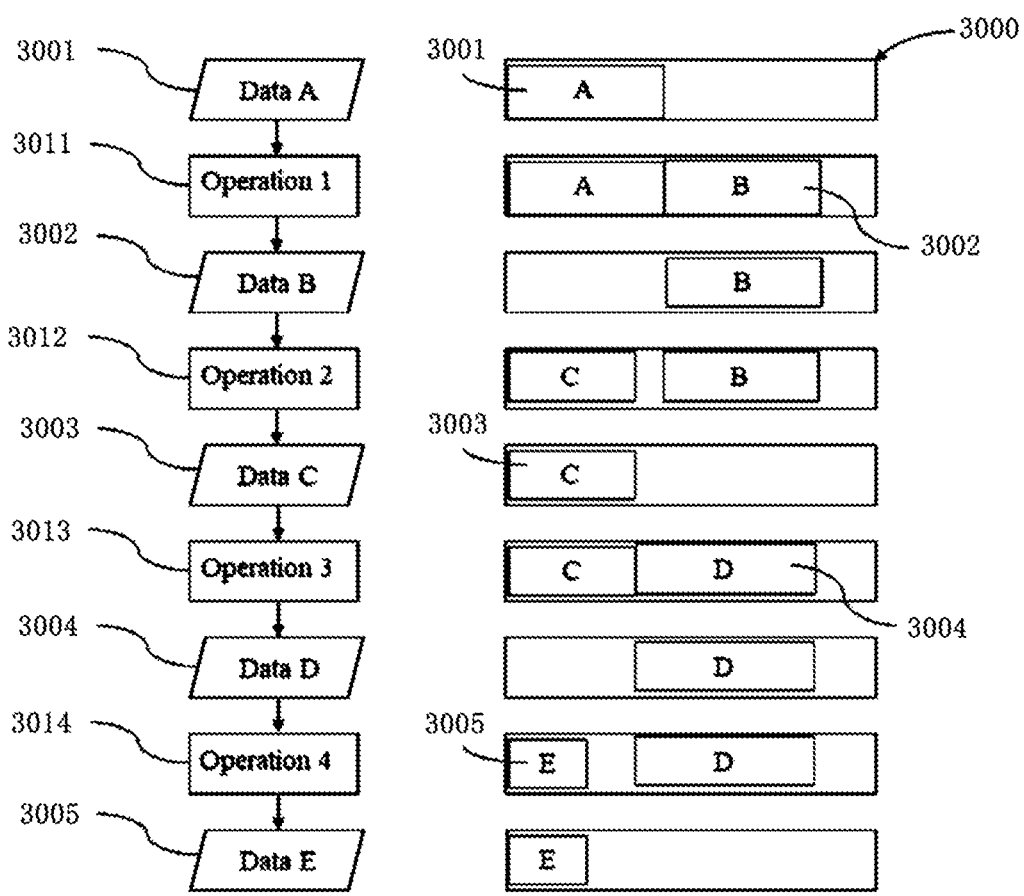
FIG. 2 illustrates a diagram showing a series of data operation where the data amount of each operation does not exceed the capacity of the memory unit.

FIG. 2 illustrates a diagram showing a series of data operation where the data amount of each operation does not exceed the capacity of the memory unit. The left part of FIG. 2 shows a series of operations and data, and the right part of FIG. 2 shows a storage of data in a memory unit. In the example shown in FIG. 2, an input data A 3001 can be processed by a series of data operation to obtain an output data E 3005. The series of data operation can comprise operation 1 3011 to operation 4 3014 which are sequentially performed. The output data of a preceding operation can serve as the input data of a subsequent operation.

The memory unit 3000 can be any suitable RAM including static random-access memory (SRAM), dynamic random-access memory (DRAM), synchronous dynamic random-access memory (SDRAM), double data rate (DDR), double data rate synchronous dynamic random-access memory (DDR SDRAM), DDR, DDR2, DDR3, T-RAM, Z-RAM, and so forth. In some instances, the memory unit can be an on-chip memory of an embedded device.

In some embodiments, the entire input data and the entire output data of an operation can be stored in the same memory unit in performing the operation. A size of the output data of an operation can be determined based at least in part on a size of the input data and a number of factors (e.g., parameters) of the operation, as discussed hereinabove. For instance, the size of the output data of a convolution operation (e.g., a convolution layer) can depend on hyper-parameters such as depth, stride and zero-padding of the convolution. In an exemplary example, the size of the output data B of operation 1 can be determined when the input data A is available, and a storage space for the output data B can be reserved in the memory unit. The storage space for the output data B can be continuous or in the memory unit, for example, the output data B can be stored in the storage space with continuous memory address. The storage space for the output data B can optionally be not continuous in the memory unit, for example, the output data B can be stored in the memory unit as a plurality of data fractions.

As shown in FIG. 2, before the operation 1 is performed, input data A can be stored in the memory unit 3000 as the data to be processed. In performing the operation 1, both the input data A and output data B of the operation 1 can be stored in the memory unit. After the operation 1 is completed, the first intermediate data result B can be stored in the memory unit as the output of the operation 1 and also the input of the operation 2. In performing the operation 2, both the input data B and output data C of the operation 2 can be stored in the memory unit. After the operation 2 is completed, the second intermediate data result C can be stored in the memory unit as the output of the operation 2 and also the input of the operation 3. The output data E can be stored in the memory unit once all the operations 1-4 are completed.

In the example shown in FIG. 2, the capacity of the memory unit is large enough for the operations 1-4, meaning that the amount of input data and output data for any one of the operations 1-4 does not exceed the capacity of the memory unit. For example, the amount of input data A and output data B for the operation 1 does not exceed the capacity of the memory unit, the amount of input data B and output data C for the operation 2 does not exceed the capacity of the memory unit, the amount of input data C and output data D for the operation 3 does not exceed the capacity of the memory unit, and the amount of input data D and output data E for the operation 4 does not exceed the capacity of the memory unit. In this exemplary example, no external memory device is necessary to store the input data, the intermediate data and the output data in performing the operations.

Figure 3:
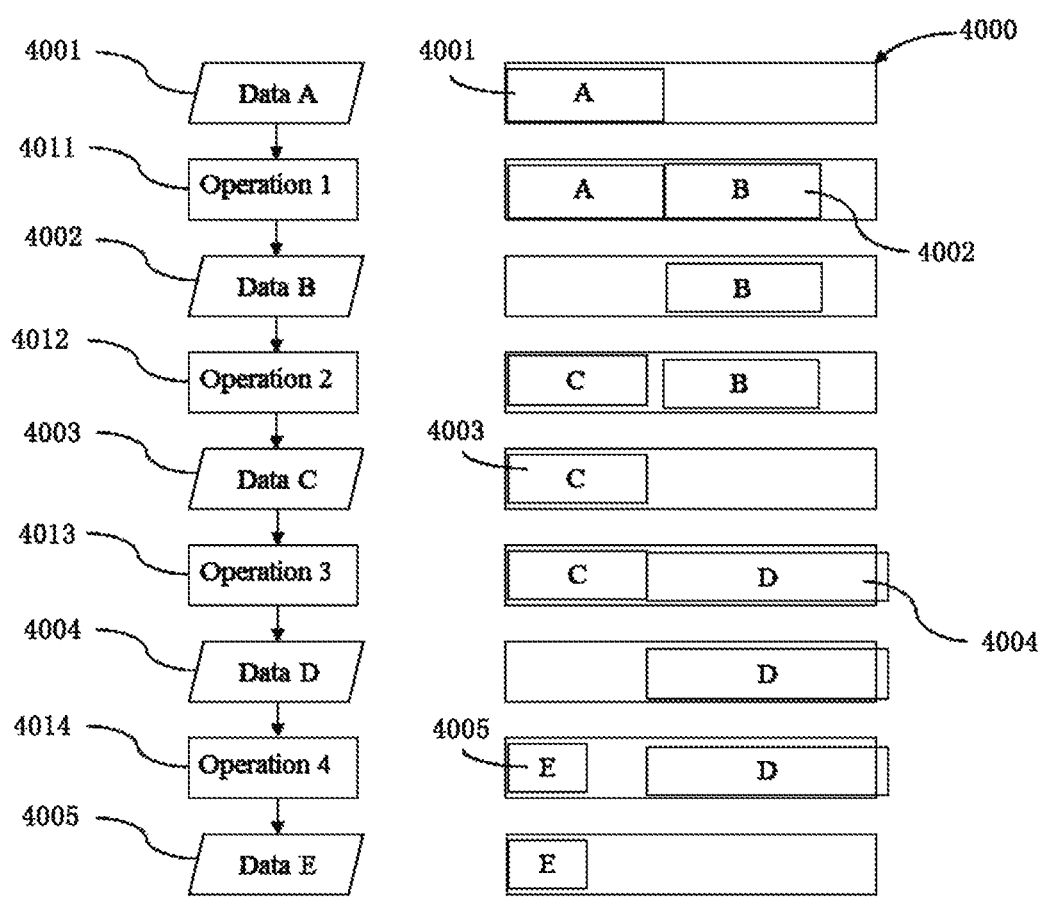
FIG. 3 illustrates a diagram showing a series of data operation where the data amount of an operation exceeds the capacity of the memory unit.

FIG. 3 illustrates a diagram showing a series of data operation where the data amount of an operation exceeds the capacity of the memory unit. The left part of FIG. 3 shows a series of operations and data, and the right part of FIG. 3 shows a storage of data in a memory unit 4000. In the example shown in FIG. 3, an input data A 4001 can be processed by a series of data operation to obtain an output data E 4005. The series of data operation can comprise operation 1 4011 to operation 4 4014 which are sequentially performed. The output data of a preceding operation can serve as the input data of a subsequent operation. For example, the input data A 4001 is first processed by a first operation 1 4011 to obtain a first intermediate data result B 4002. The series of data operation can comprise a series of convolutional operations or tensor operations. In some instances, the entire input data and the entire output data of an operation can be stored in the same memory unit in performing the operation.

In the exemplary example shown in FIG. 3, before the operation 1 is performed, input data A can be stored in the memory unit as the data to be processed. In performing the operation 1, both the input data A and output data B of the operation 1 can be stored in the memory unit. After the operation 1 is completed, the first intermediate data result B can be stored in the memory unit as the output of the operation 1 and also the input of the operation 2.

In the exemplary example shown in FIG. 3, the capacity of the memory unit is not large enough for the operations 1-4, meaning that the amount of input data and output data for one or more of the operations 1-4 exceeds the capacity of the memory unit. For example, the amount of input data and output data for operation 3 exceeds the capacity of the memory unit. In this case, the operation 3 cannot be performed within the memory unit. One solution to this scenario is to store the input data and/or output data of the operation 3 in an external memory device. However, a computation performance can be decreased due to a lower reading/writing speed in the external memory device and/or a system bus occupation.

Another solution to this scenario is to group the operation 3 with one or more other operations such that the amount of overall input data and overall output data of the grouped operations does not exceed the capacity of the memory unit. In some instances, the one or more operations to be grouped with the operation 3 can include at least one operation which is immediately adjacent to the operation 3. Various operation grouping schemes can be possible. For instance, operation 3 can be grouped with the operation 2 if the amount of overall input data B and overall output data D of the grouped operations does not exceed the capacity of the memory unit. For instance, operation 3 can be grouped with the operation 4 if the amount of overall input data C and overall output data E of the grouped operations does not exceed the capacity of the memory unit. For instance, the operation 3 can be grouped with operation 1 and operation 2 if the amount of overall input data A and overall output data D of the grouped operations does not exceed the capacity of the memory unit. For instance, the operation 3 can be grouped with operation 2 and operation 4 if the amount of overall input data B and overall output data E of the grouped operations does not exceed the capacity of the memory unit. Various operation grouping schemes will be described with reference to FIG. 4 and FIG. 5 hereinafter.

Figure 4:
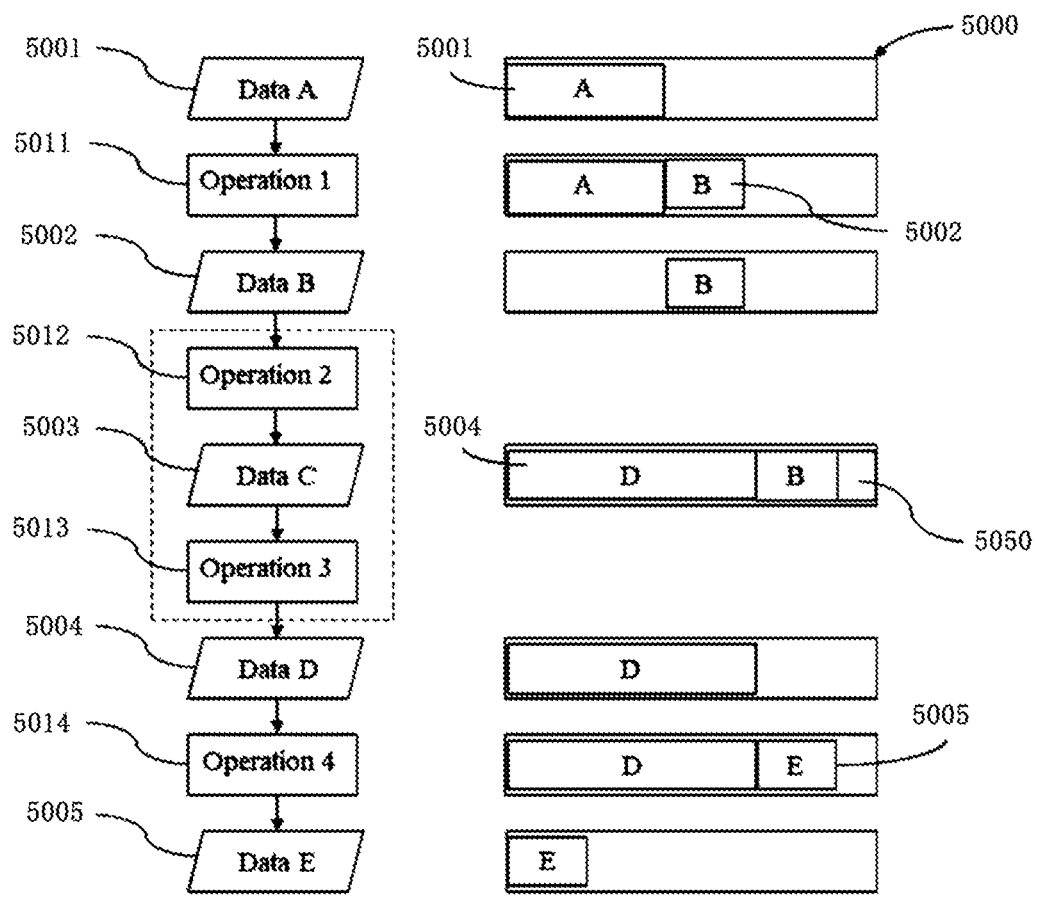
FIG. 4 illustrates a diagram showing a scheme of grouping an operation with another in accordance with embodiments of the invention, the operation having a data amount exceeding the capacity of a memory unit.

FIG. 4 illustrates a diagram showing a scheme of grouping an operation with another in accordance with embodiments of the invention, the operation having an amount of input data and output data exceeding the capacity of a memory unit. The left part of FIG. 4 shows a series of operations 5011-5014 and data 5001-5005, and the right part of FIG. 4 shows a storage of data in a memory unit 4000. The exemplary example shown in FIG. 4 provides a solution to address the data storage issue of the operation 3 as shown in FIG. 3 where the amount of input data C and output data D of the operation 3 exceeds the capacity of the memory unit.

In the example shown in FIG. 4, any first operation (e.g., the operation 3 5013) having an amount of input data and output data exceeding the capacity of the memory unit 4000 can be identified based at least in part on the input data of the operation and one or more parameters of the operation. For instance, the size of the output data of a convolution operation (e.g., a convolution layer) can depend on hyper-parameters such as depth, stride and zero-padding of the convolution, as discussed hereinabove. In the shown example, the size of the output data D 5004 of operation 3 5013 can be determined when the input data A 5001 is available, and a determination can be made on whether the sum of the input data C 5003 and the output data D 5004 can be entirely stored in the memory unit.

At least one second operation can be selected from the series of operations when it is determined that a first operation from among the series of operations has an amount of input data and an output data exceeding the capacity of the memory unit. A processing of the first operation can be grouped with a processing of the second operation provided that the input data and output data of the grouped operations does not exceed the capacity of the memory unit. For instance, in the example shown in FIG. 4, the operation 3 5013 (e.g., the first operation) and the operation 2 5012 (e.g., the second operation) can be grouped and processed with an overall input data B 5002 and an overall output data D 5004 when the sum of data B 5002 and data D 5004 does not exceed the capacity of the memory unit 5000.

The first operation can be grouped with one or more second operations provided that the input data and output data of the grouped operations does not exceed the capacity of the memory unit. One or more grouping schemes can be possible for an identified first operation. The one or more second operations can comprise an operation from the series of operations which is immediately adjacent to the first operation. For instance, the operation 3 can be grouped with operations 1 5011 and 2 5012, while the operation 3 may not be grouped with operation 1 5011 alone. The one or more second operations can comprise an operation from the series of operations which is immediately preceding the first operation. Optionally, the one or more second operations can comprise an operation from the series of operations which is immediately subsequent to the first operation. Optionally, the one or more second operations can comprise an operation from the series of operations which is immediately preceding the first operation and an operation from the series of operations which is immediately subsequent to the first operation. For instance, the operation 2 and operation 4 can be grouped with the operation 3 if the amount of overall input data B and overall output data E of the grouped operation does not exceed the capacity of the memory unit.

The remaining storage space of the memory unit can be used to store at least a portion of an intermediate data result of the grouped operations. For example, the remaining storage space of the memory unit can store therein M equal parts of the intermediate data result, M being an integer of 2 or larger. Optionally, the remaining storage space of the memory unit can store therein arbitrary portion of the intermediate data result. In the example shown in FIG. 4, the remaining storage space 5050 of the memory unit 5000, shown by the hatched area, can be used to store at least a portion of an intermediate data result C 5003 of the grouped operations. A portion of the input data of the grouped operations can be processed based at least in part on an amount of the intermediate data result of the grouped operations. For instance, a portion of the input data B of the grouped operations 2 and 3 can be processed to generate a portion of the intermediate data result C of the grouped operations, and the portion of the intermediate data result C of the grouped operations can then be processed to generate a portion of the output data D of the grouped operations. The processing on separate portions of the input data B of the grouped operations can be performed a plural of times until all portions of the input data B are processed. The output data D of the grouped operations can be obtained when all portions of the output data D of the grouped operations are generated. The processing on separate portions of the input data of the grouped operations will be described hereinbelow.

A region for storing a data in the memory unit can be changed during the data processing. For instance, in the example shown in FIG. 4, data B can be originally stored in the memory unit successively to data A, and a region for storing data B in the memory unit can be shifted to accommodate data D which is larger in size than data A. It is apparent to those skilled in the art that a region for storing data B in the memory unit may not be shifted if a size of data D is equal to or smaller than data A. Another strategy is to store data B in an end region of the memory unit so as to eliminate the need of shifting data B.

Figure 5:
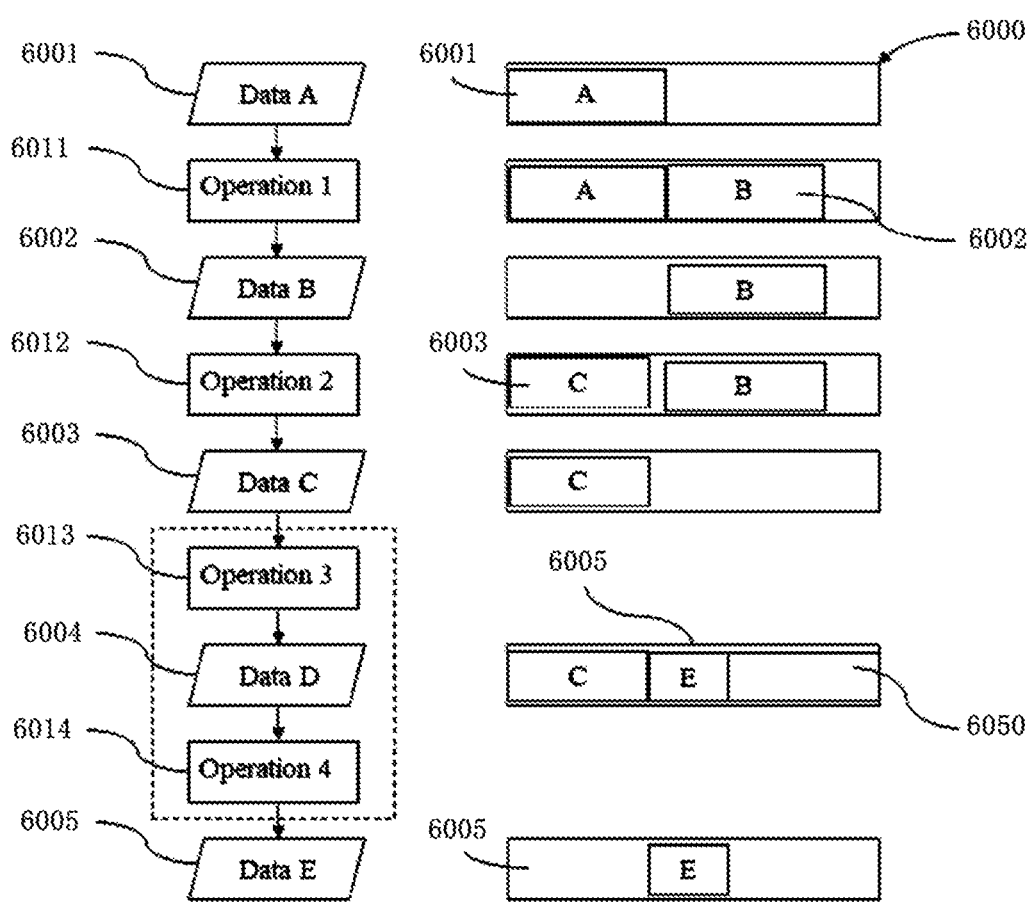
FIG. 5 illustrates a diagram showing another scheme of grouping a operation with another in accordance with embodiments of the invention, the operation having a data amount exceeding the capacity of a memory unit.

FIG. 5 illustrates a diagram showing another scheme of grouping an operation with another in accordance with embodiments of the invention, the operation having a data amount exceeding the capacity of a memory unit. The left part of FIG. 5 shows a series of operations 6011-6014 and data 6001-6005, and the right part of FIG. 5 shows a storage of data in a memory unit 6000. The exemplary example shown in FIG. 5 provides another solution to address the data storage issue of the operation 3 as shown in FIG. 3 where the amount of input data C and output data D of the operation 3 exceeds the capacity of the memory unit.

In the example shown in FIG. 5, once the operation 3 6013 is identified from the series of operations 6011-6014 as a first operation having an amount of input data and output data exceeding the capacity of the memory unit 6000, the operation 4 6014 can be selected from the series of operations, and the operation 3 6013 and the operation 4 6014 (e.g., the fourth operation) can be grouped and processed with an overall input data C 6003 and an overall output data E 6005 when the sum of data C and data E does not exceed the capacity of the memory unit 6000. The remaining storage space of the memory unit can be used to store at least a portion of an intermediate data result of the grouped operations. In the example shown in FIG. 5, the remaining storage space 6050 of the memory unit, shown by the hatched area, can be used to store at least a portion of an intermediate data result D of the grouped operations. For example, the remaining storage space 6050 of the memory unit can store therein M equal parts of the intermediate data result D, M being an integer of 2 or larger. Optionally, the remaining storage space 6050 of the memory unit can store therein arbitrary portion of the intermediate data result D. A portion of the input data of the grouped operations can be processed based at least in part on an amount of the intermediate data result of the grouped operations. For instance, a portion of the input data C of the grouped operations 3-4 can be processed to generate a portion of the intermediate data result D of the grouped operations, and the portion of the intermediate data result D of the grouped operations can then be processed to generate a portion of the output data E of the grouped operations. The processing on separate portions of the input data C of the grouped operations can be performed a plural of times until all portions of the input data C are processed. The output data E of the grouped operations can be obtained when all portions of the output data E of the grouped operations are generated.

Example 1

In an exemplary example with reference to FIG. 1, we assume that the data A accounts for 40% of capacity of the memory unit, the data B accounts for 15% of capacity of the memory unit, the data C accounts for 40% of capacity of the memory unit, the data D accounts for 70% of capacity of the memory unit, and the data E accounts for 20% of capacity of the memory unit. In this example, the operation 3 can be identified as a first operation having an amount of input data C and output data D of exceeding the capacity of the memory unit (e.g., 40%+70%>100%).

In some embodiments, the identified operation 3, which has an amount of input data C and output data D exceeding the capacity of the memory unit, can be grouped with the at least one second operation selected from among the series of operations. The at least one second operation can be the operation 2, as shown in the grouping scheme of FIG. 4. With this grouping scheme, the grouped operations 2-3 can have an overall input data B and an overall output data D. The remaining storage space 5050 of the memory unit 5000 (e.g., the remaining storage space of the memory unit in which the input data and the output data of the grouped operations are already stored) can be used to store at least a portion of an intermediate data result C of the grouped operations. The remaining storage space 5050 of the memory unit can be the storage space in which the portion of the intermediate data result C being temporarily stored. In this example, the remaining storage space 5050 of the memory unit is 15% of the entire capacity of the memory unit (e.g., 100%−15%−70%=15%), meaning that only a portion of the intermediate data result C can be stored in the memory unit (e.g., 40%>15%). The portion of the intermediate data result C, which is to be stored in the memory unit, can be determined based on the amount of the entire intermediate data result C and the remaining storage space 5050 of the memory unit. In some instances, one of M equal parts of the intermediate data result C can be stored in the memory unit, M being an integer of 2 or larger. For instance, in the exemplary example, ⅓ of the intermediate data result C can be stored in the memory unit (e.g., 40%/15%=2.667). The value of M can be determined by dividing the size of the intermediate data result by the size of the remaining storage space of the memory unit, and rounding the division result up to the next larger integer (e.g., the division result 2.667 can be rounded up to integer 3). Optionally, the remaining storage space 5050 of the memory unit can store therein arbitrary portion of the intermediate data result C.

A portion of the input data of the grouped operations can be processed at a time to generate a portion of the output data of the grouped operations. The portion of the input data of the grouped operations can be determined based at least in part on an amount of the intermediate data result of the grouped operations. In some instances, the portion of the input data of the grouped operations can comprise one of N equal parts of the input data and a marginal data, N being an integer of 2 or larger. The integer N can be identical to the integer M. Here, the portion of the input data of the grouped operations being processed at a time can depend on the portion of the intermediate data result being stored in the remaining storage space of the memory unit, because the portion of the intermediate data result corresponds to the portion of the input data of the grouped operations.

In the exemplary example, ⅓ of the input data B of the grouped operations can be processed at a time to generate 1/3 of the intermediate data result C, and the ⅓ of the intermediate data result C can then be processed to generate 1/3 of the output data D of the grouped operations. The processing can be performed 3 times, such that an entire output data D can be obtained.

In some instances, the portion of the input data of the grouped operations can comprise at least a part of another portion of the input data of the grouped operations, meaning that there is an overlap in portion of the input data to be processed. In the exemplary example, more than ⅓ of the input data B of the grouped operations can be processed at a time.

Alternatively, the identified operation 3, which has an amount of input data and output data exceeding the capacity of the memory unit, can be grouped with operation 4, as shown in the grouping scheme of FIG. 5. The grouped operations can have an overall input data C 6003 and an overall output data E 6005. The remaining storage space of the memory unit can be used to store at least a portion of an intermediate data result D 6004 of the grouped operations. In the exemplary example, the remaining storage space 6050 of the memory unit is 40% of the entire capacity of the memory unit (e.g., 100%−40%−20%=40%), meaning that only a portion of the intermediate data result D can be stored in the memory unit. The portion of the intermediate data result D can be determined based on the amount of the entire intermediate data result D and the remaining storage space of the memory unit. In some instances, one of M equal parts of the intermediate data result D can be stored in the memory unit. For instance, in the exemplary example, ½ of the intermediate data result D can be stored in the memory unit (e.g., 70%/40%=1.75). In the exemplary example, ½ of the input data C of the grouped operations can be processed at a time to generate 1/2 of the intermediate data result D, and the ½ of the intermediate data result D can then be processed to generate 1/2 of the output data E of the grouped operations. The processing can be performed twice, such that an entire output data E can be obtained. Optionally, the remaining storage space 6050 of the memory unit can store therein arbitrary portion of the intermediate data result D.

Among the two possible grouping schemes for the identified operation 3, the grouping scheme where the operation 3 is grouped with the operation 4 can be preferable as the operation 3 can be performed with less sub-operations (e.g., two sub-operations). In other words, when two or more grouping schemes are possible where the number of the second operations is the same, a determination can be made on which one of the grouping schemes is preferable. The criterion of the determination can be that the number of sub-operations in performing the identified first operation being minimal.

The above exemplary grouping schemes are discussed providing that the kernels of the convolutional operations are not stored in the memory unit. For example, the kernels can be stored in another memory device such as a ROM. In some instances, however, the kernels can be stored in the same memory unit where the data is stored. For example, the kernel for each operation can accounts for 1% of capacity of the memory unit, then the grouped operations 2-3 can have an overall input data which accounts for 17% of capacity of the memory unit (e.g., 15%+1%+1%=17%), and the remaining storage space 5050 of the memory unit is 13% (e.g., 100%−17%−70%=13%) of the entire capacity of the memory unit.

Example 2

In another exemplary example with reference to FIG. 1, we assume that the data A accounts for 40% of capacity of the memory unit, the data B accounts for 40% of capacity of the memory unit, the data C accounts for 80% of capacity of the memory unit, the data D accounts for 80% of capacity of the memory unit, and the data E accounts for 10% of capacity of the memory unit. In this example, the operation 2 can be identified from the series of operations 1-4 as a first operation having an amount of input data and output data exceeding the capacity of the memory unit (e.g., 40%+80%>100%).

One second operation can first be selected from the series of operations when the operation 2 is identified, which second operation is to be grouped with the identified operation 2. In this example, there are two possible grouping schemes when only one second operation is to be grouped with the operation 2. For example, the operation 1 can be grouped with the operation 2, or the operation 3 can be grouped with the operation 2. With the first grouping scheme, the operation 1 can be grouped with the operation 2. A determination can then be made on whether an amount of the input data A and the output data C of the grouped operations 1-2 exceeds the capacity of the memory unit. Here, the determination is that the amount of the input data A and the output data C of the grouped operations 1-2 exceeds the capacity of the memory unit (e.g., 40%+80%>100%). With the second grouping scheme, the operation 3 can be grouped with the operation 2. A determination can then be made on whether an amount of the input data B and the output data D of the grouped operations 2-3 exceeds the capacity of the memory unit. Here, the determination is that the amount of the input data B and the output data D of the grouped operations 1-2 exceeds the capacity of the memory unit (e.g., 40%+80%>100%). To this end, a determination can be made that it is not possible to perform the identified operation 2 by grouping the operation 2 with one second operation (e.g., either the operation 1 immediately preceding the identified operation 2 or the operation 3 immediately subsequent to the identified operation 2).

In this scenario, the number of second operations, which are to be grouped with the identified operation 2, can be incrementally increased until the amount of the input data and the output data of the grouped operations does not exceed the capacity of the memory unit. For instance, two second operations can be selected from the series of operation to be grouped with the operation 2. In this example, there are two possible grouping schemes when two second operations are to be grouped with the operation 2. For example, the operation 1 and operation 3 can be grouped with the operation 2, or the operation 3 and operation 4 can be grouped with the operation 2. With the first grouping scheme, the grouped operations can comprise the operations 1-3. A determination can then be made on whether an amount of the input data A and the output data D of the grouped operations 1-3 exceeds the capacity of the memory unit. Here, the determination is that the amount of the input data A and the output data D of the grouped operations 1-3 exceeds the capacity of the memory unit (e.g., 40%+80%>100%). With the second grouping scheme, the grouped operations can comprise the operations 2-4. A determination can then be made on whether an amount of the input data B and the output data E of the grouped operations 2-4 exceeds the capacity of the memory unit. Here, the determination is that the amount of the input data B and the output data E of the grouped operations 2-4 exceeds the capacity of the memory unit (e.g., 40%+10%<100%). To this end, a determination can be made that it is possible to perform the identified operation 2 by grouping the operation 2 with two second operations 3 and 4.

In this scenario, two intermediate data result C and D of the grouped operations can be generated in performing the grouped operations 2-4. The remaining storage space of the memory unit can be used to store at least a portion of an intermediate data result C and a portion of an intermediate data result D of the grouped operations 2-4. In this example, the remaining storage space of the memory unit is 50% of the entire capacity of the memory unit (e.g., 100%-40%-10%=50%), meaning that only a portion of the intermediate data result C and a portion of the intermediate data result D can be stored in the memory unit. The portion of the intermediate data results C and D can be determined based on the amount of the entire intermediate data results C and D and the remaining storage space of the memory unit. In some instances, one of N equal parts of the intermediate data result C and one of N equal parts of the intermediate data result D can be stored in the memory unit. For instance, in this example, ¼ of the intermediate data result C and ¼ of the intermediate data result D can be stored in the memory unit (e.g., (80%+80%)/50%=3.2). In this example, ¼ of the input data B of the grouped operations can be processed at a time to generate ¼ of the intermediate data result C, and the ¼ of the intermediate data result C can then be processed to generate ¼ of the intermediate data result D, and the ¼ of the intermediate data result D can then be processed to generate ¼ of the output data E of the grouped operations. The processing can be performed four times, such that an entire output data E can be obtained. Optionally, the remaining storage space of the memory unit can store therein arbitrary portion of the intermediate data result C and arbitrary portion of the intermediate data result D.

The remaining storage space of the memory unit can be allocated to store the two or more intermediate data results based on a relation in data size among the intermediate data results. In this example, a relation in data size between the intermediate data results C and D is 1:1 (e.g., 80%:80%), therefore, 50% of the remaining storage space of the memory unit can be allocated for intermediate data result C, and 50% of the remaining storage space of the memory unit can be allocated for intermediate data result D. The allocation of the remaining storage space of the memory unit can be different considering the parameters of the operation. For instance, parameters such as padding, stride and kernel can be considered in determining the allocation of the remaining storage space of the memory unit when the operation is a convolution. In some instances, the remaining storage space of the memory unit can be allocated to store the two or more intermediate data results based on a structure of the memory unit. For instance, the memory unit can be linear, meaning that a data can be stored in the memory unit starting from arbitrary address. In other words, a data can be stored in the memory unit immediately after another data. Optionally, the memory unit can comprise a plurality of smaller storage units (e.g., slices), meaning that a data can only be store in one or more storage units. In other words, a data alignment can be necessary to ensure that the input data, output data and intermediate data result are stored in different slices.

Example 3

In yet another exemplary example with reference to FIG. 1, we assume that the data A accounts for 10% of capacity of the memory unit, the data B accounts for 40% of capacity of the memory unit, the data C accounts for 80% of capacity of the memory unit, the data D accounts for 80% of capacity of the memory unit, and the data E accounts for 10% of capacity of the memory unit. In this example, the operation 2 can be identified from the series of operations 1-4 as a first operation having an amount of input data and output data of the operation 2 exceeding the capacity of the memory unit (e.g., 40%+80%>100%).

One second operation can first be selected from the series of operations when the operation 2 is identified, which second operation is to be grouped with the identified operation 2. In this example, there are two possible grouping schemes when only one second operation is to be grouped with the operation 2. For example, the operation 1 can be grouped with the operation 2, or the operation 3 can be grouped with the operation 2. With the first grouping scheme, the operation 1 can be grouped with the operation 2. A determination can then be made on whether an amount of the input data A and the output data C of the grouped operations 1-2 exceeds the capacity of the memory unit. Here, the determination is that the amount of the input data A and the output data C of the grouped operations 1-2 does not exceed the capacity of the memory unit (e.g., 10%+80%<100%). With the second grouping scheme, the operation 3 can be grouped with the operation 2. A determination can then be made on whether an amount of the input data B and the output data D of the grouped operations 2-3 exceeds the capacity of the memory unit. Here, the determination is that the amount of the input data B and the output data D of the grouped operations 1-2 exceeds the capacity of the memory unit (e.g., 40%+80%>100%). To this end, a determination can be made that it is possible to perform the identified operation 2 by grouping the operation 2 with one second operation (e.g., the operation 1 which immediately precedes the identified operation 2).

In this example, ¼ of the intermediate data result B can be stored in the memory unit (e.g., 40%/(100%-10%-80%) =4.0, meaning that the grouped operations can be successfully performed by 4 sub-operations. For instance, ¼ of the input data A of the grouped operations 1-2 can be processed at a time to generate 1/4 of the intermediate data result B, and the ¼ of the intermediate data result B can then be processed to generate 1/4 of the intermediate data result C. The processing can be performed four times, such that an entire output data C can be obtained. In some instances, however, the above division result can be at least rounded up to the next larger integer (e.g., the division result 4 can be rounded up to the next larger integer 5, the division result 2.667 can be rounded up to the next larger integer 3, the division result 3.2 can be rounded up to the next larger integer 4) considering the parameters of the operation and/or a structure of the memory unit. For instance, parameters such as padding, stride and kernel can be considered in determining the portion of the input data of the grouped operations when the operation is a convolution.

In this example, there's no need to determine whether it is possible to perform the identified operation 2 by grouping the operation 2 with a larger number of second operation as long as the identified operation 2 can be successfully performed by grouping with a smaller number of the second operation. For instance, since the identified operation 2 can be successfully performed by grouping with the operation 1, there's no need to incrementally increase the number of the second operation and determine whether it is possible to perform the identified operation 2 by grouping more other operations. However, if the identified operation 2 is not successfully performed by grouping with a smaller number of the second operation, the number of second operation can be incrementally increased until the operation 2 can be successfully performed by grouping more second operations, as discussed hereinabove.

In some instances, the output data and/or the input data of the grouped operations can be stored in an external memory when (1) a number of operations in the grouped operations is equal to a number of operations in the series of operations, and (2) the amount of the input data and the output data of the grouped operations exceeds the capacity of the memory unit. This scenario can happen when the number of second operation is incrementally increased to the maximum value and the identified operation (i.e., the first operation having an amount of input data and output data exceeding the capacity of the memory unit) still cannot be successfully performed.

Example 4

For instance, In yet another exemplary example with reference to FIG. 1, the data A accounts for 60% of capacity of the memory unit, the data B accounts for 60% of capacity of the memory unit, the data C accounts for 80% of capacity of the memory unit, the data D accounts for 80% of capacity of the memory unit, and the data E accounts for 60% of capacity of the memory unit. The operation 1 can be identified as an operation (i.e., the first operation) can having an amount of input data and output data exceeding the capacity of the memory unit. Then, at least one second operation can be selected from operations 2-4, which second operation is to be grouped with the identified operation 1.

The immediately adjacent operation 2 is first selected to be grouped with the operation 1. However, the grouped operations 1 and 2 cannot be performed with both the input data A and the output data C stored in the memory unit, as the sum of data A and data C exceeds the capacity of the memory unit (e.g., 60%+80%>100%). In this case, the number of second operations can be incrementally increased to 2, meaning that the operations 2 and 3 being grouped with the operation 1. However, the grouped operations 1-3 cannot be performed with both the input data A and the output data D stored in the memory unit, as the sum of data A and data D exceeds the capacity of the memory unit (e.g., 60%+ 80%>100%). Then, the number of second operations can be incrementally increased to 3, meaning that the operations 2-4 being grouped with the operation 1. However, the grouped operations 1-4 cannot be performed with both the input data A and the output data E stored in the memory unit, as the sum of data A and data E exceeds the capacity of the memory unit (e.g., 60%+60%>100%).

To this end, a determination can be made that (1) the number of operations in the grouped operations is equal to the number of operations in the series of operations (e.g., the grouped operations include operations 1-4), and (2) the amount of the input data and the output data of the grouped operations exceeds the capacity of the memory unit (e.g., the amount of overall input data A and output data E of the grouped operations exceeds the capacity of the memory unit). In some instances, the input data A can be stored in an external memory such that the memory unit can be used to store the entire output data E and a portion of the intermediate data B, C and D. A portion of the input data A can be read from the external memory for each sub-operation, and a portion of the output data E can be generated based on the calculated intermediate data B, C and D. The portion of the input data A can be determined based at least in part on an amount of an intermediate data B, C and D of the grouped operations 1-4 and the amount of the output data E, as discussed hereinabove. Optionally, the output data E can be stored in an external memory such that the memory unit can be used to store the entire input data A and a portion of the intermediate data B, C and D. A portion of the input data A can be processed for each sub-operation, and a portion of the output data E can be generated based on the calculated intermediate data B, C and D and stored into the external memory. The portion of the input data A can be determined based at least in part on an amount of an intermediate data B, C and D of the grouped operations 1-4 and the amount of the input data A, as discussed hereinabove. Optionally, both the input data A and the output data E can be stored in the external memory, and the memory unit can be used to store at least a portion of the intermediate data B, C and D only.

Figure 6:
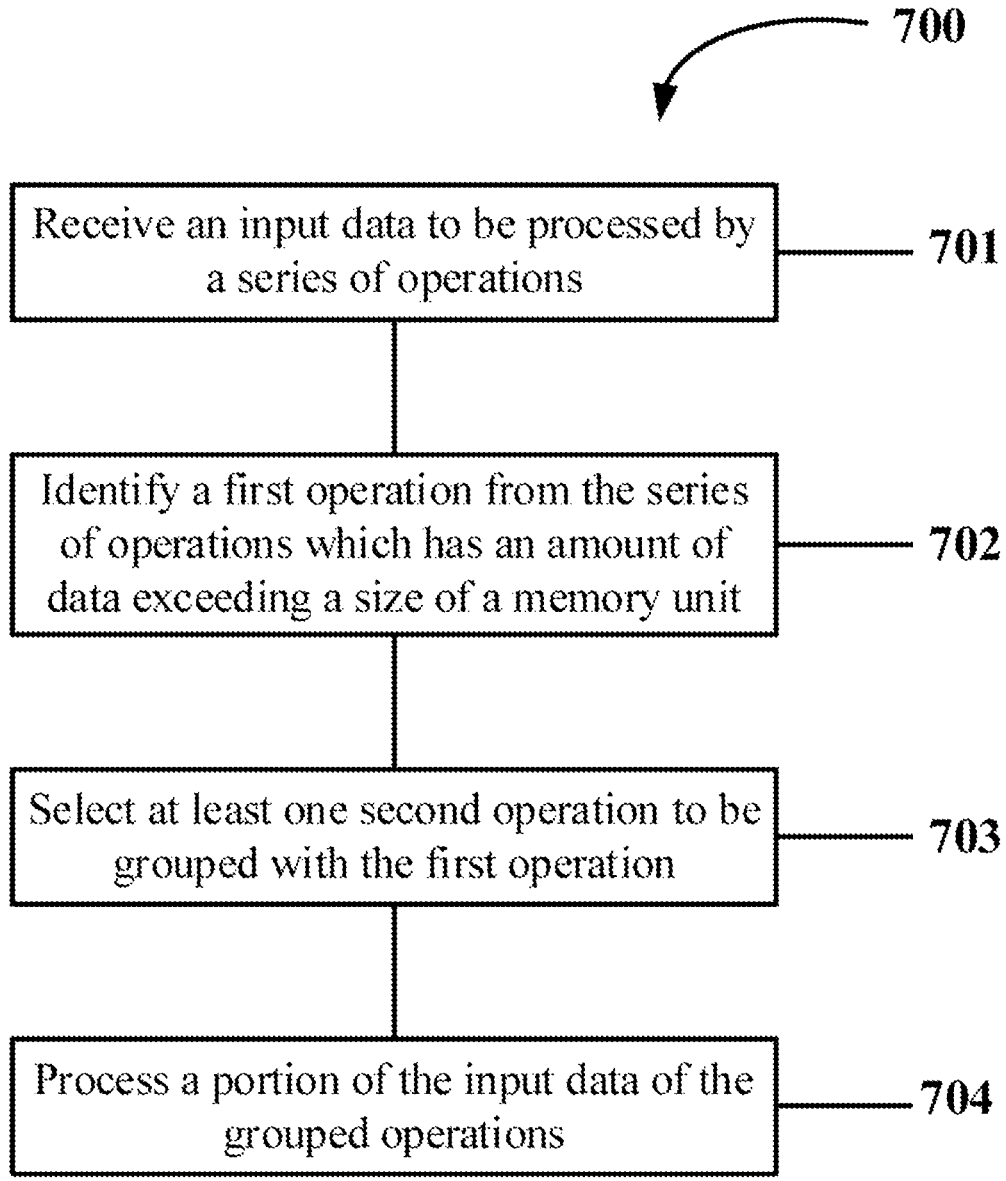
FIG. 6 shows a flow chart of an exemplary method of data operation in accordance with embodiments of the invention.

FIG. 6 shows a flow chart of an exemplary method 700 of data operation in accordance with embodiments of the invention. The method 700 can be used to process an input data by a series of data operation to obtain an output data. The series of data operation can comprise a plurality of operations which are sequentially performed. The output data of a preceding operation can serve as the input data of a subsequent operation. The series of data operation can comprise a series of convolutional operations or tensor operations. The tensor operation can comprise pooling, upscaling or ReLU. One or more layers for each type of operation can be provided. The input data A can be image data, audio, video data and various others. The method 700 can comprise processes 701 to 704.

In process 701, an input data to be processed by a series of operations can be received.

In process 702, a first operation from the series of operations can be identified, which first operation having an amount of an input data and an output data exceeding a capacity of a memory unit. In some embodiments, the entire input data and the entire output data of an operation from among the series of operations can be stored in the same memory unit in performing the operation. A size of the output data of an operation can be determined based at least in part on a size of the input data and a number of factors (e.g., parameters) of the operation, as discussed hereinabove.

In process 703, at least one second operation can be selected from the series of operations. The at least one second can be grouped with the first based at least in part on an amount of an input data and an output data of the grouped operations and the capacity of the memory unit.

At least one second operation can be selected from the series of operations when it is determined that a first operation from among the series of operations has an amount of input data and an output data exceeding the capacity of the memory unit. A processing of the first operation can be grouped with a processing of the second operation provided that the input data and output data of the grouped processing does not exceed the capacity of the memory unit. For instance, in the example shown in FIG. 4, the operation 3 (e.g., the first operation having a sum of input data and output data exceeding the capacity of the memory unit) and the operation 2 (e.g., the second operation) can be grouped and processed with an overall input data B and an overall output data D provided that the sum of data B and data D does not exceed the capacity of the memory unit.

The at least one second operation can comprise at least one operation from the series of operations which is immediately adjacent to the first operation. For instance, the at least one second operation can comprise an operation from the series of operations which is immediately preceding the first operation or immediately subsequent to the first operation.

In some embodiments, the process 703 can comprise determining whether the amount of input data and output data of the grouped operations exceed the capacity of the memory. A number of operations in the at least one second operation can be incrementally increased until the amount of the input data and the output data of the grouped operations does not exceed the capacity of the memory unit. The output data and/or the input data of the grouped operations can be stored in an external memory when (1) the number of operations in the grouped operations is equal to a number of operations in the series of operations, and (2) the amount of the input data and the output data of the grouped operations exceeds the capacity of the memory unit.

In process 704, a portion of the input data of the grouped operations can be processed to obtain a portion of the output data of the grouped operations. In other words, the entire input data of the grouped operations can be processed by a plurality of sub-processes each of which processes a portion of the input data of the grouped operations.

The portion of the input data, which is processed in each sub-process, can be determined based at least in part on an amount of an intermediate data result of the grouped operations. The memory unit can be configured to store therein the entire input data and the entire output data of the grouped operations, and the remaining storage space of the memory unit can be used to store at least a portion of an intermediate data result of the grouped operations. In some instances, one of M equal parts of the intermediate data result C can be stored in the memory unit, M being an integer of 2 or larger.

Optionally, the memory unit can store therein arbitrary portion of the intermediate data result C. The portion of the input data of the grouped operations can comprise one of N equal parts of the input data and a marginal data, N being an integer of 2 or larger. The integer N can be identical to the integer M. Here, the portion of the input data of the grouped operations being processed at a time can depend on the portion of the intermediate data result being stored in the remaining storage space of the memory unit, because the portion of the intermediate data result corresponds to the portion of the input data of the grouped operations.

In some embodiments, the method 700 can further comprise assembling each portion of the output data of the grouped operation to obtain the output data of the grouped operation.

The disclosure further provides a system of data processing. The system can comprise one or more processors, at least one memory unit and one or more memories having instructions stored thereon. The memory unit can be any suitable RAM including static random-access memory (SRAM), dynamic random-access memory (DRAM), synchronous dynamic random-access memory (SDRAM), double data rate (DDR), double data rate synchronous dynamic random-access memory (DDR SDRAM), DDR, DDR2, DDR3, T-RAM, Z-RAM, and so forth. In some instances, the memory unit can be an on-chip memory of an embedded device.

The instructions stored on the one or more memories, when executed by the one or more processors, can cause the one or more processors to (a) receive an input data to be processed by a series of operations; (b) identify a first operation from the series of operations, wherein the first operation has an amount of an input data and an output data exceeding a capacity of the memory unit; (c) select at least one second operation from the series of operations to be grouped with the first operation based at least in part on an amount of an input data and an output data of the grouped operations and the capacity of the memory unit; and (d) process a portion of the input data of the grouped operations, the portion of the input data being determined based at least in part on an amount of an intermediate data result of the grouped operations.

The series of operations comprise a series of convolution operations and/or series of tensor operations. In some instances, the process (c) can comprise incrementally increase a number of operations in the at least one second operation until the amount of the input data and the output data of the grouped operations does not exceed the capacity of the memory unit. The process (c) can further comprise storing the output data and/or the input data of the grouped operations in an external memory when (1) a number of operations in the grouped operations is equal to a number of operations in the series of operations, and (2) the amount of the input data and the output data of the grouped operations exceeds the capacity of the memory unit.

Figure 7:
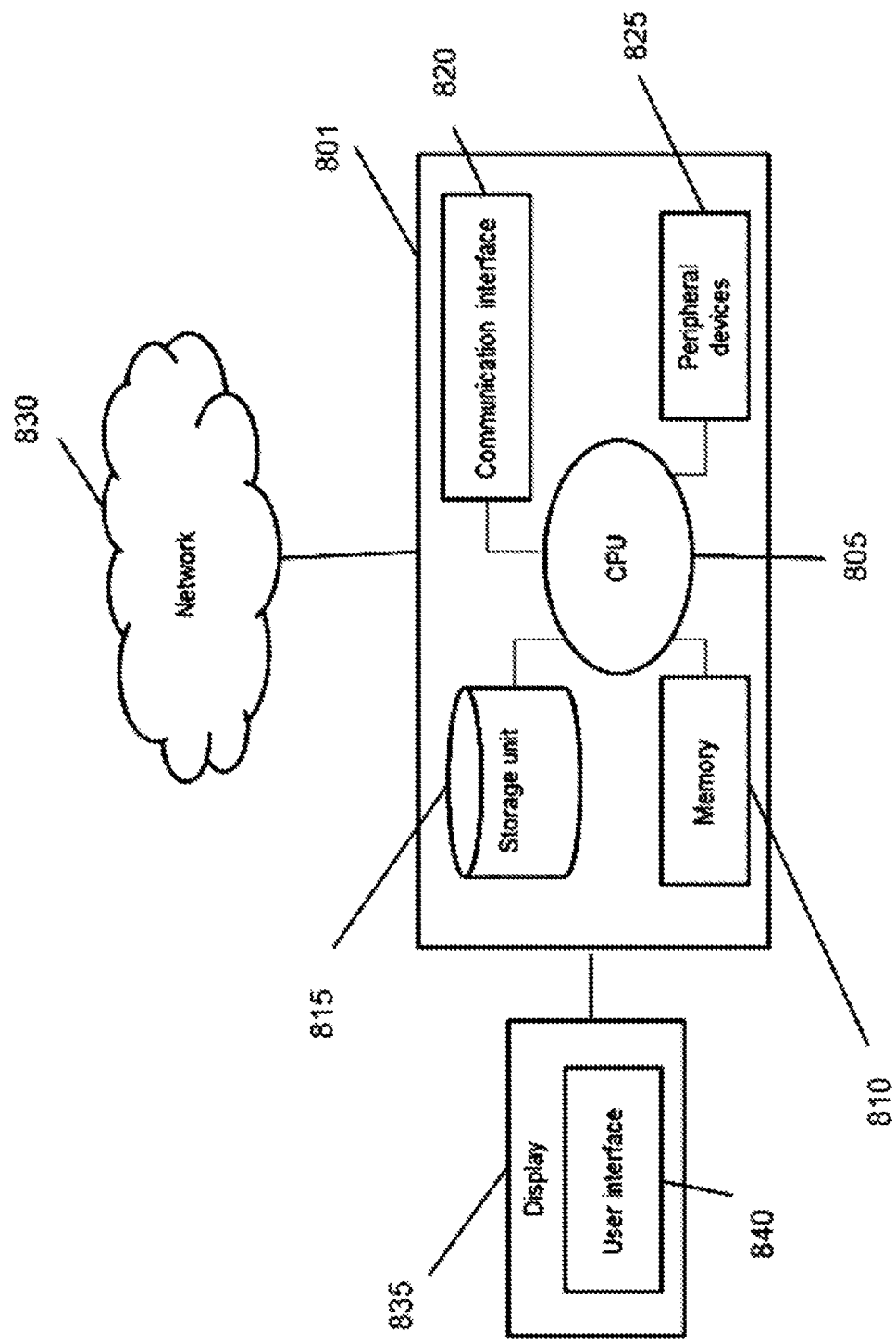
FIG. 7 shows a computer system that can be configured to implement any computing system disclosed in the present application.

FIG. 7 shows a computer system 801 that can be configured to implement any computing system disclosed in the present application. The computer system 801 can comprise a mobile phone, a tablet, a wearable device, a laptop computer, a desktop computer, a central server, etc.

The computer system 801 includes a central processing unit (CPU, also "processor" and "computer processor" herein) 805, which can be a single core or multi core processor, or a plurality of processors for parallel processing. The CPU can be the processor as described above. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. In some cases, the communication interface may allow the computer to be in communication with another device such as the imaging device or audio device. The computer may be able to receive input data from the coupled devices for analysis. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 can include fetch, decode, execute, and writeback.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user. Examples of remote computer systems include personal computers, slate or tablet PC's, smart phones, personal digital assistants, and so on. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 710 for ready access by the processor 805. In some situations, the electronic storage unit 815 can be precluded, and machine-executable instructions are stored on memory 810.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface 840 for providing, for example, a management interface. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 805.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of data processing, said method comprising:
    (a) receiving, by a processor, an input data to be processed by a series of sequentially performed operations;
    (b) identifying, by the processor, a first operation from the series of operations, wherein the first operation has a first amount of an input data and an output data exceeding a capacity of a memory unit;
    (c) selecting, by the processor, at least one second operation from the series of operations to be grouped with the first operation based at least in part on a second amount of an input data and an output data of the grouped operations and the capacity of the memory unit, wherein the at least one second operation comprises an operation from the series of operations which is immediately preceding the first operation; and
    (d) processing, by the processor, a portion of the input data of the grouped operations, wherein the portion of the input data of the grouped operations is determined based at least in part on an amount of an intermediate data result of the grouped operations,
    wherein (c) comprises determining whether the second amount of the input data and the output data of the grouped operations exceeds the capacity of the memory unit, and incrementally increasing a number of operations in the at least one second operation until the second amount of the input data and the output data of the grouped operations does not exceed the capacity of the memory unit or until a number of operations in the grouped operations equals a number of operations in the series of operations and the second amount of input data and the output data of the grouped operations exceeds the capacity of the memory unit; and
    wherein the portion of the input data of the grouped operations comprises one of N equal parts of the input data of the grouped operations and a marginal data, N being an integer of 2 or larger, and wherein (c) comprises determining the at least one second operation such that the value of N is minimal,
    wherein (c) further comprises storing the output data of the grouped operations in an external memory when (1) a number of operations in the grouped operations is equal to a number of operations in the series of operations, and (2) the second amount of the input data and the output data of the grouped operations exceeds the capacity of the memory unit, or
    (c) further comprises storing the input data of the grouped operations in an external memory when (1) a number of operations in the grouped operations is equal to a number of operations in the series of operations, and (2) the second amount of the input data and the output data of the grouped operations exceeds the capacity of the memory unit, or
    (c) further comprises storing the input data and the output data of the grouped operations in an external memory when (1) a number of operations in the grouped operations is equal to a number of operations in the series of operations, and (2) the second amount of the input data and the output data of the grouped operations exceeds the capacity of the memory unit.

2. The method of claim 1, wherein in a case where (c) further comprises storing the output data of the grouped operations in an external memory when (1) a number of operations in the grouped operations is equal to a number of operations in the series of operations, and (2) the second amount of the input data and the output data of the grouped operations exceeds the capacity of the memory unit,
    (d) comprises storing the input data of the grouped operations and the intermediate data result of the grouped operations in the memory unit.

3. The method of claim 1, wherein in a case where (c) further comprises storing the input data of the grouped operations in an external memory when (1) a number of operations in the grouped operations is equal to a number of operations in the series of operations, and (2) the second amount of the input data and the output data of the grouped operations exceeds the capacity of the memory unit,
    (d) comprises receiving the portion of the input data of the grouped operations from the external memory, or storing the intermediate data result and the output data of the grouped operations in the memory unit, or storing the input data of the grouped operations, the intermediate data result and the output data of the grouped operations in the memory unit.

4. A system of data processing, said system comprising:
    one or more processors;
    a memory unit; and
    one or more memories having instructions stored thereon which when executed by the one or more processors cause the one or more processors to:
    (a) receive an input data to be processed by a series of sequentially performed operations;
    (b) identify a first operation from the series of operations, wherein the first operation has a first amount of an input data and an output data exceeding a capacity of the memory unit;
    (c) select at least one second operation from the series of operations to be grouped with the first operation based at least in part on a second amount of an input data and an output data of the grouped operations and the capacity of the memory unit, wherein the at least one second operation comprises an operation from the series of operations which is immediately preceding the first operation; and
    (d) process a portion of the input data of the grouped operations, wherein the portion of the input data of the grouped operations is determined based at least in part on an amount of an intermediate data result of the grouped operations,
    wherein (c) comprises determining whether the second amount of the input data and the output data of the grouped operations exceeds the capacity of the memory unit, and incrementally increasing a number of operations in the at least one second operation until the second amount of the input data and the output data of the grouped operations does not exceed the capacity of the memory unit or until a number of operations in the grouped operations equals a number of operations in the series of operations and the second amount of input data and the output data of the grouped operations exceeds the capacity of the memory unit, and wherein the portion of the input data of the grouped operations comprises one of N equal parts of the input data of the grouped operations and a marginal data, N being an integer of 2 or larger, and wherein (c) comprises determining the at least one second operation such that the value of N is minimal, wherein (c) further comprises storing the output data of the grouped operations in an external memory when (1) a number of operations in the grouped operations is equal to a number of operations in the series of operations, and (2) the second amount of the input data and the output data of the grouped operations exceeds the capacity of the memory unit, or (c) further comprises storing the input data of the grouped operations in an external memory when (1) a number of operations in the grouped operations is equal to a number of operations in the series of operations, and (2) the second amount of the input data and the output data of the grouped operations exceeds the capacity of the memory unit, or (c) further comprises storing the input data and the output data of the grouped operations in an external memory when (1) a number of operations in the grouped operations is equal to a number of operations in the series of operations, and (2) the second amount of the input data and the output data of the grouped operations exceeds the capacity of the memory unit.

5. The system of claim 4, wherein in a case where (c) further comprises storing the output data of the grouped operations in an external memory when (1) a number of operations in the grouped operations is equal to a number of operations in the series of operations, and (2) the second amount of the input data and the output data of the grouped operations exceeds the capacity of the memory unit, (d) comprises storing the input data of the grouped operations and the intermediate data result of the grouped operations in the memory unit, or wherein in a case where (c) further comprises storing the input data of the grouped operations in an external memory when (1) a number of operations in the grouped operations is equal to a number of operations in the series of operations, and (2) the second amount of the input data and the output data of the grouped operations exceeds the capacity of the memory unit, (d) comprises receiving the portion of the input data of the grouped operations from the external memory, or storing the intermediate data result and the output data of the grouped operations in the memory unit, or storing the input data of the grouped operations, the intermediate data result and the output data of the grouped operations in the memory unit.

6. A non-transitory computer readable medium comprising machine executable code that, upon execution by one or more computer processors, implements a method of data processing, said non-transitory computer readable medium comprising:

program instructions for (a) receiving an input data to be processed by a series of sequentially performed operations;

program instructions for (b) identifying a first operation from the series of operations, wherein the first operation has a first amount of an input data and an output data exceeding a capacity of a memory unit;

program instructions for (c) selecting at least one second operation from the series of operations to be grouped with the first operation based at least in part on a second amount of an input data and an output data of the grouped operations and the capacity of the memory unit, wherein the at least one second operation comprises an operation from the series of operations which is immediately preceding the first operation; and program instructions for (d) processing a portion of the input data of the grouped operations, wherein the portion of the input data of the grouped operations is determined based at least in part on an amount of an intermediate data result of the grouped operations, wherein (c) comprises determining whether the second amount of the input data and the output data of the grouped operations exceeds the capacity of the memory unit, and incrementally increasing a number of operations in the at least one second operation until the second amount of the input data and the output data of the grouped operations does not exceed the capacity of the memory unit; and wherein the portion of the input data of the grouped operations comprises one of N equal parts of the input data of the grouped operations and a marginal data, N being an integer of 2 or larger, and wherein (c) comprises determining the at least one second operation such that the value of N is minimal, wherein (c) further comprises storing the output data of the grouped operations in an external memory when (1) a number of operations in the grouped operations is equal to a number of operations in the series of operations, and (2) the second amount of the input data and the output data of the grouped operations exceeds the capacity of the memory unit, or (c) further comprises storing the input data of the grouped operations in an external memory when (1) a number of operations in the grouped operations is equal to a number of operations in the series of operations, and (2) the second amount of the input data and the output data of the grouped operations exceeds the capacity of the memory unit, or (c) further comprises storing the input data and the output data of the grouped operations in an external memory when (1) a number of operations in the grouped operations is equal to a number of operations in the series of operations, and (2) the second amount of the input data and the output data of the grouped operations exceeds the capacity of the memory unit.

* * * * *